(12) United States Patent
Duncan et al.

(10) Patent No.: US 9,973,111 B2
(45) Date of Patent: *May 15, 2018

(54) GRAPHENE SHEET AND NANOMECHANICAL RESONATOR

(71) Applicant: Elwha LLC, Bellevue, WA (US)

(72) Inventors: William D. Duncan, Mill Creek, WA (US); Roderick A. Hyde, Redmond, WA (US); Jordin T. Kare, San Jose, CA (US); Thomas A. Weaver, San Mateo, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/137,971

(22) Filed: Apr. 25, 2016

(65) Prior Publication Data

US 2016/0241164 A1  Aug. 18, 2016

Related U.S. Application Data

(63) Continuation of application No. 13/887,550, filed on May 6, 2013, now Pat. No. 9,325,259, which is a continuation of application No. 13/398,566, filed on Feb. 16, 2012, now abandoned.

(51) Int. Cl.
| | |
|---|---|
| *H02N 1/00* | (2006.01) |
| *C01B 31/04* | (2006.01) |
| *B82Y 30/00* | (2011.01) |
| *B82Y 40/00* | (2011.01) |
| *C01B 32/182* | (2017.01) |
| *C01B 32/194* | (2017.01) |

(52) U.S. Cl.
CPC .............. *H02N 1/006* (2013.01); *B82Y 30/00* (2013.01); *B82Y 40/00* (2013.01); *C01B 32/182* (2017.08); *C01B 32/194* (2017.08); *H02N 1/00* (2013.01); *Y10S 977/734* (2013.01); *Y10S 977/932* (2013.01)

(58) Field of Classification Search
CPC .......... H02N 1/00; H02N 1/006; B82Y 30/00; B82Y 40/00; C01B 31/0484; C01B 31/0438; Y10S 977/932; Y10S 977/734
See application file for complete search history.

(56) References Cited

U.S. PATENT DOCUMENTS

| | | |
|---|---|---|
| 6,803,840 B2 | 10/2004 | Hunt et al. |
| 7,439,731 B2 | 10/2008 | Crafts et al. |
| 7,551,044 B2 | 6/2009 | Naito |
| 7,710,106 B2 | 5/2010 | Crafts et al. |

(Continued)

OTHER PUBLICATIONS

Xie, et al., An Asymmetrically Surface-Modified Graphene Film Electrochemical Actuator, ACS Nano 2010; 4(10): 6050-6054.*

(Continued)

*Primary Examiner* — Daniel C McCracken
(74) *Attorney, Agent, or Firm* — Foley & Lardner LLP

(57) ABSTRACT

A nanomechanical resonator includes processing electronics configured to control an actuator to actively control a resonant frequency of a portion of a graphene sheet by applying a variable out-of-plane force to the graphene sheet. The graphene sheet is at least partially suspended from a support structure and has a carbon lattice that substantially defines a plane.

35 Claims, 20 Drawing Sheets

(56) References Cited

U.S. PATENT DOCUMENTS

| | | | |
|---|---|---|---|
| 7,765,607 | B2 | 7/2010 | Faris |
| 7,884,525 | B2 | 2/2011 | Culpepper et al. |
| 7,888,753 | B2 | 2/2011 | Afzali-Ardakani et al. |
| 8,024,279 | B2 | 9/2011 | Ryhanen et al. |
| 8,026,560 | B2 | 9/2011 | Afzali-Ardakani et al. |
| 9,325,259 | B2 * | 4/2016 | Duncan .................. H02N 1/00 |
| 2007/0082459 | A1 | 4/2007 | Faris |
| 2008/0157235 | A1 | 7/2008 | Rogers et al. |
| 2010/0002402 | A1 | 1/2010 | Rogers et al. |
| 2010/0071100 | A1 | 3/2010 | Faris |
| 2010/0116630 | A1 | 5/2010 | Pinkerton |
| 2010/0173422 | A1 | 7/2010 | Koley et al. |
| 2010/0214034 | A1 | 8/2010 | Peng et al. |
| 2011/0018566 | A1 | 1/2011 | Crafts et al. |
| 2011/0171427 | A1 | 7/2011 | Kim et al. |

OTHER PUBLICATIONS

Shin, et al., Flexible and transparent graphene films as acoustic actuator electrodes using inkjet printing, Chem. Commun. 2011; 47: 8527-8529.*

Liang, et al., Electromechanical Actuator with Controllable Motion, Fast Response Rate, and High-Frequency Resonance Based on Graphene and Polydiacetylene, ACS Nano 2012; 6(5): 4508-4519.*

Tian, et al., Single-layer graphene sound-emitting devices: experiments and modeling, Nanoscale 2012; 4: 2272-2277.*

Bell et al., Precision Cutting and Patterning of Graphene with Helium Ions, Nanotechnology 2009, 6 pages.

Bunch et al., Electromechanical Resonators from Graphene Sheets, www.sciencemag.org/content/315/5811/490.figures-only, Jan. 2007, 2 pages.

Geim et al., The Rise of Graphene, Nature Materials 2007, 9 pages.

Huang et al., The Application of Graphene Based Materials for Actuators, J. Mater. Chem. 2012; 22: 3671-3679.

Meyer et al., Direct Image of Lattice Atoms and Topological Defects in Graphene Membranes, Nano Letters 2008, 5 pages.

Sazonova et al., A Tunable Carbon Nanotube Electromechanical Oscillator, 2004, 12 pages.

Schniepp et al., Functionalized Single Graphene Sheets Derived from Splitting Graphene Oxide, J. Phys. Chem. B. 2006, 5 pages.

Scientific Background on the Nobel Prize in Physics 2010 Graphene compiled by the class for Physics of the Royal Swedish Academy of Sciences, Oct. 5, 2010, 11 pages.

Teweldebrhan et al., Modification of Graphene Properties Due to Electron-Beam Irradiation, Applied Physics Letters 2009, 3 pages.

Wang et al., Chemical Origin of a Graphene Moire Overlayer on RU(0001), Phys. Chem., 2008, 5 pages.

Zsoldos, Effect of Topological Defects on Graphene Geometry and Stability, Nanotechnology, Science and Applications, 2010;3 101-106, 6 pages.

* cited by examiner

GRAPHENE SHEET AND NANOMECHANICAL RESONATOR

CROSS-REFERENCE TO RELATED APPLICATIONS

The present application is a continuation of application Ser. No. 13/887,550, filed May 6, 2013, which is currently co-pending, which is a continuation of application Ser. No. 13/398,566, filed Feb. 16, 2012, both of which are incorporated herein by reference in their entireties.

BACKGROUND

The present application relates generally to the field of graphene sheets. One aspect of the present application more specifically relates to tailoring the buckling properties of graphene sheets by configuring the spatial distribution of defects in the graphene sheet. Another aspect of the present application more specifically relates to graphene nanomechanical resonators.

Nanotechnology is a rapidly developing field, which includes the development of nanostructures (e.g., nanotubes, fullerines, nanostrips, etc.) and nanomechanical systems (NEMS). The small scale of nanotechnology makes it an ideal match for electronics systems. For example, NEMS may be used in semiconductors, switches, and memory applications. Graphene is one material that is being used in a NEMS, and it may be desirable in certain applications to cause the graphene nanostructure to buckle. There is a need for an improved method of tailoring the buckling properties of graphene.

A resonator is an apparatus that exhibits resonance. That is, the resonator naturally oscillates with greater amplitude at some frequencies (i.e., resonant frequencies) than at others. The oscillations in a resonator may be electromagnetic or mechanical (e.g., acoustic). Resonators may be used to generate waves of specific frequencies or to filter signals (i.e., select specific frequencies from a signal) for electronics, ultrasonic acoustics, etc. Tunable resonators permit a single resonator to be used for multiple frequencies.

SUMMARY

One embodiment relates to a graphene sheet. The graphene sheet includes a carbon lattice and a spatial distribution of defects in the carbon lattice. The spatial distribution of defects is configured to tailor the buckling properties of the graphene sheet.

Another embodiment relates to a method of tailoring the buckling properties of a graphene sheet. The method includes growing a graphene sheet and forming a spatial distribution of defects in the graphene sheet, the spatial distribution of defects configured to tailor the buckling properties of the graphene sheet.

Another embodiment relates to a nanomechanical resonator including a support structure; a graphene sheet at least partially suspended from the support structure, the graphene sheet having a carbon lattice that substantially defines a plane; and an actuator configured to actively control the resonant frequency of a portion of the graphene sheet by varying an out-of-plane force applied to the graphene sheet.

Another embodiment relates to a method of controlling the resonant frequency of a suspended graphene nanomechanical resonator. The method includes providing a support structure; providing a graphene sheet having a carbon lattice that substantially defines a plane, the graphene sheet at least partially suspended from the support structure; and controlling the resonant frequency of the graphene by actively varying an out-of-plane force applied to the graphene sheet.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the figures, graphene sheets, nanomechanical resonators, and components thereof are shown according to exemplary embodiments. Graphene sheets or films are formed of a lattice of carbon atoms, which are typically arranged in a honeycomb lattice of hexagonal linkages. Defects may be formed in the lattice by doping the graphene sheet with non-carbon atoms, functionalizing the graphene sheet with chemical functional groups, and forming non-hexagonal carbon linkages (e.g., pentagons, heptagons, etc.). These defects may be arranged to form formations (e.g., blisters, dimples, etc.) that extend out of the plane of the graphene lattice. Systems and methods for forming the formations are described in detail below. The buckling properties of the graphene sheet may be tailored based on the spatial distribution of the defects. For example, the defects may be arranged to induce or inhibit buckling of the graphene sheet either locally, regionally, or globally.

A nanomechanical resonator includes a graphene sheet that is suspended from one or more support structures. An actuator is configured to apply an out-of-plane (i.e., normal, non-coplanar with the carbon lattice of the graphene, etc.) force to the graphene sheet. The out-of-plane force may be, for example, electrostatic, magnetic, mechanical, or gas pressure. The actuator is configured to actively control the resonant frequency of the graphene by actively varying the out-of-plane force applied to the graphene sheet. The actuator may be configured to change the resonant frequency of the graphene sheet to a target value (e.g., to a new value, to a reference value in response to an environmental disturbance, etc.). According to one embodiment, processing electronics may be used to control (e.g., command the actuator, provide a signal to the actuator, respond to feedback information, etc.) the out-of-plane forces applied to the graphene sheet.

Before discussing further details of the graphene sheets, nanomechanical resonators, and the components thereof, it should be noted that for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
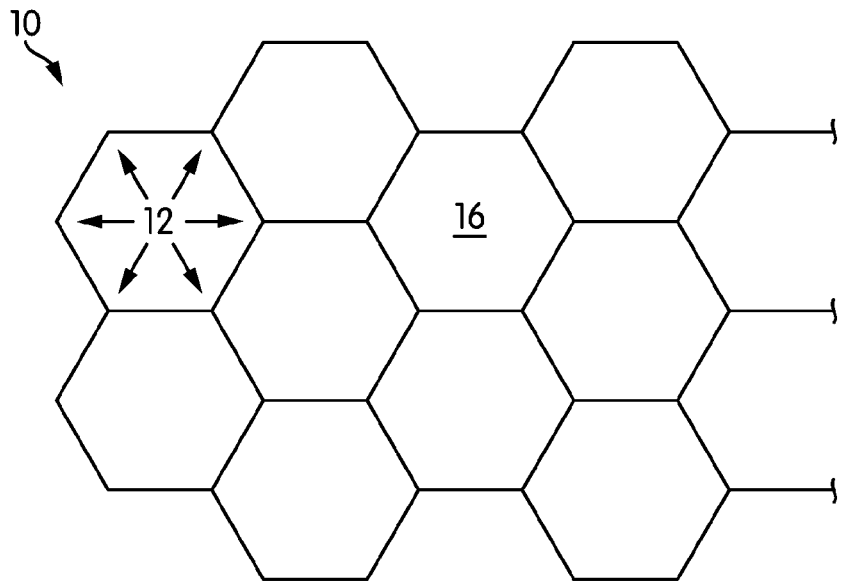
FIG. 1 is a schematic plan view of a portion of a graphene sheet, shown according to an exemplary embodiment.
Figure 2:
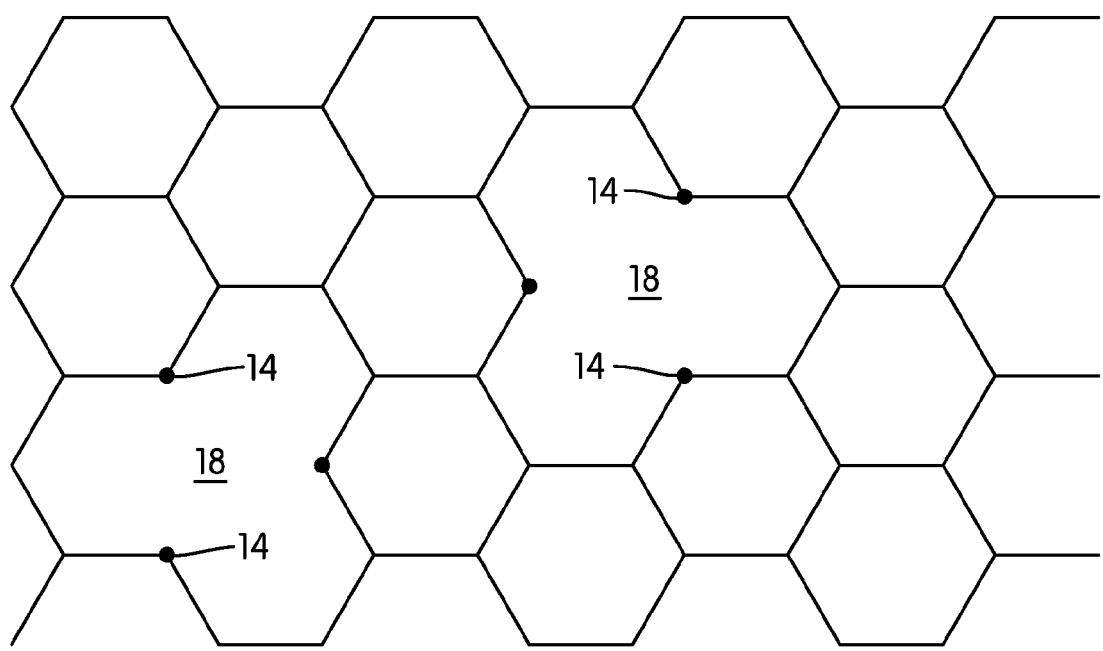
FIG. 2 is a schematic plan view of a portion of a graphene sheet, shown according to another embodiment.

Referring to FIGS. 1-2, schematic plan views of a portion of a graphene sheet 10 are shown according to exemplary embodiments. Graphene forms a lattice of carbon atoms 12, which are typically arranged in a honeycomb lattice of hexagonal linkages 16 (e.g., cells, rings, etc.). A monolayer graphene sheet or film includes a substantially two-dimensional, one-atom-thick plane. For the purposes of this application, the carbon lattice of the graphene sheet is referred to as being a plane even though in practice, the sheet may have waves or ripples passing therethrough, or may exhibit curvature on a macro scale. One of skill in the art will understand that the graphene sheet has planar properties even though it may not meet a strict geometric definition of a plane.

Graphene sheets may be formed in a variety of ways including, but not limited to, drawing, epitaxial growth, vapor deposition, etc. The graphene sheet may be pure (e.g., an all-carbon honeycomb lattice) or include one or more defects. One method of forming defects in the graphene sheet is doping, which may occur in a variety of ways. Referring to FIG. 2, a graphene sheet may be doped with non-carbon atoms. For example, nitrogen atoms 14, boron atoms, phosphorus atoms, and/or sulfur atoms may be inserted or formed into the carbon lattice. As shown, doping may reorganize (e.g., break, rearrange, etc.) the linkages 16 to create one or more holes 18 or other defects in the lattice. Another method of doping the graphene sheet (not shown) is to modify (e.g., cut, etc.) a lateral edge of the graphene sheet to create a non-uniform (e.g., ragged, substantially non-linear, etc.) boundary shape. According to another embodiment, an ion beam may be used to form defects in the graphene sheet.

Figure 3:
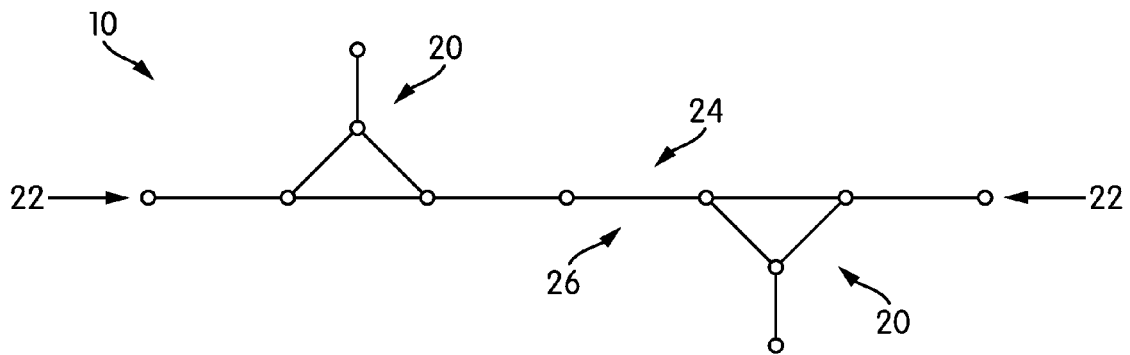
FIG. 3 is a schematic elevational view of a portion of a graphene sheet, shown according to another embodiment.

Referring to FIG. 3, a schematic elevation view of the graphene sheet 10 is shown, according to an exemplary embodiment. The graphene sheet 10 is shown to extend in plane 22 and to have a first side 24 and a second side 26, which is opposite the first side 24. The graphene sheet 10 may be doped with one or more chemical functional groups 20 (e.g., chemical groups, etc.) that extend out of the graphene plane 22. The functional group 20 may be selected from any suitable functional group, including, but not limited to oxygen, hydrogen, fluorine, methyl, ethyl, ester, phenol, hydrocarbyl, haloalkane, polypeptides, etc. The functional group 20 may couple to any number of carbon atoms in a linkage, for example, only one atom, all six atoms of a hexagonal linkage, all seven atoms of a heptagonal linkage, etc. According to one embodiment, the functional group 20 may couple to atoms of different linkages. The graphene sheet 10 may be functionalized at one or more sites. The graphene sheet 10 may be functionalized on either or both sides 24, 26 of the graphene sheet 10.

Figure 4:
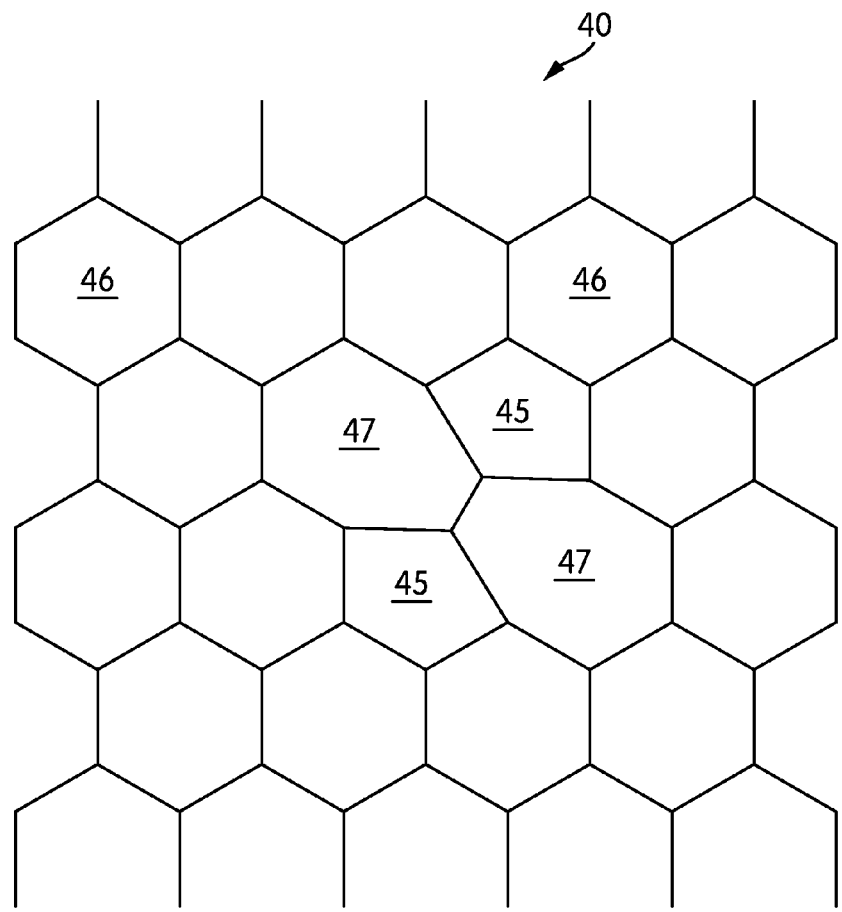
FIG. 4 is a schematic plan view of a portion of a graphene sheet, shown according to another embodiment.

Referring to FIGS. 4-8, the defects can be regions of non-hexagonal carbon linkages. For example, the graphene sheet 40, 50, 60, 70, 80 may include one or more pentagonal linkages 45, 55, 65, 75, 85, hexagonal linkages 46, 56, 66, 76, 86, and heptagonal linkages 47, 57, 67, 77, 87. The different types of linkages may be neighboring or separated. For example, referring to FIG. 4, a Stone-Wales defect is shown according to an exemplary embodiment. The defect is shown to include neighboring heptagonal linkages 47 and separated pentagonal linkages 45. This form of defect remains planar, i.e., the carbon atoms remain substantially in the plane 22 of the graphene sheet 40. The embodiment of FIG. 4 shows the Stone Wales defect to be surrounded by hexagonal linkages 46. Accordingly, in the embodiment shown, the defect is separated from other defects by region of hexagonal carbon linkages 46.

Figure 5:
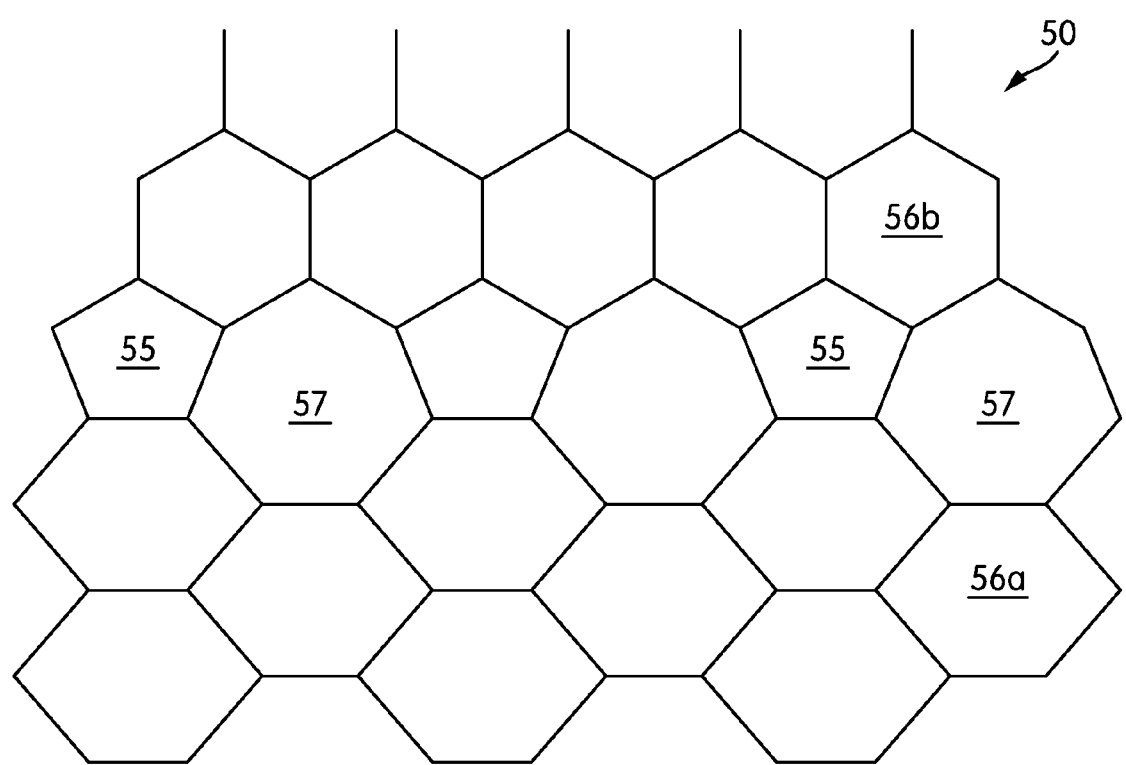
FIG. 5 is a schematic plan view of a portion of a graphene sheet, shown according to another embodiment.

Referring to FIG. 5, pentagonal linkages 55 may be separated or interspaced by heptagonal linkages 57 to substantially form a line. As shown, the pentagonal linkages 55 and the heptagonal linkages 57 are bounded by, but not separated by, hexagonal linkages 56. Further, one advantage of this spatial distribution is that it facilitates the transition from armchair oriented hexagonal linkages 56a to zigzag oriented hexagonal linkages 56b. The line of defects shown in this embodiment remains substantially coplanar with the graphene plane 22.

Figure 6A:
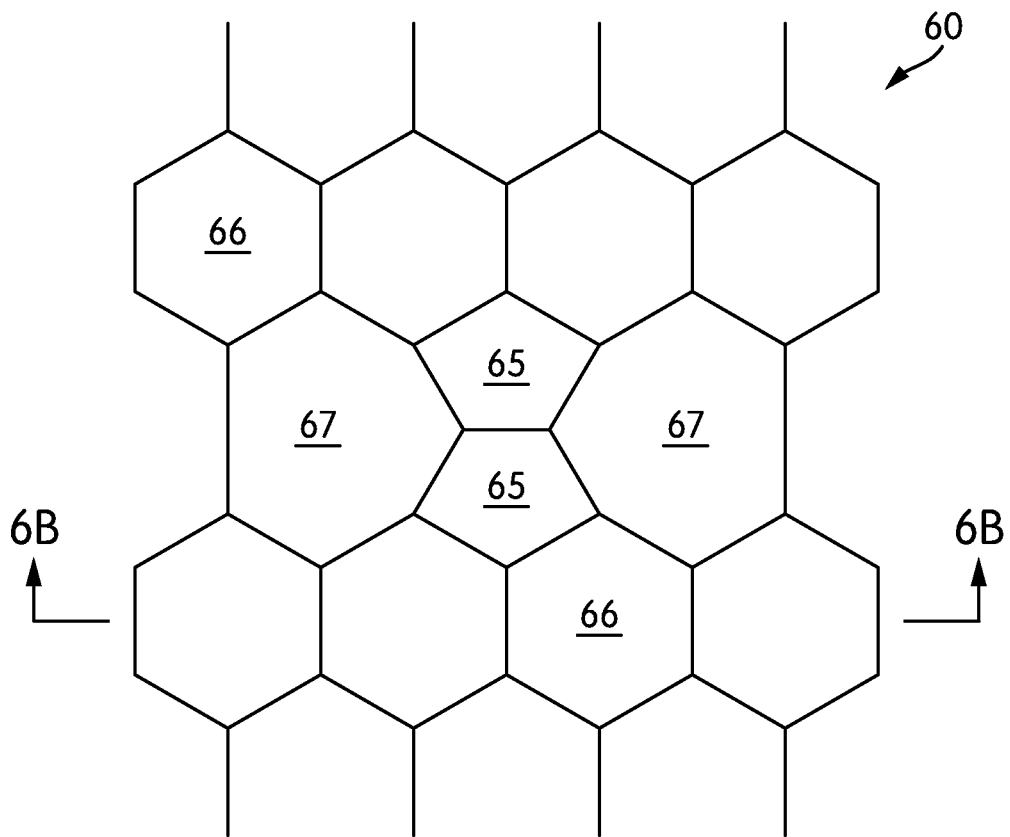
FIGS. 6A-6B are a schematic plan and elevational views, respectively, of a portion of a graphene sheet, shown according to another embodiment.
Figure 6B:
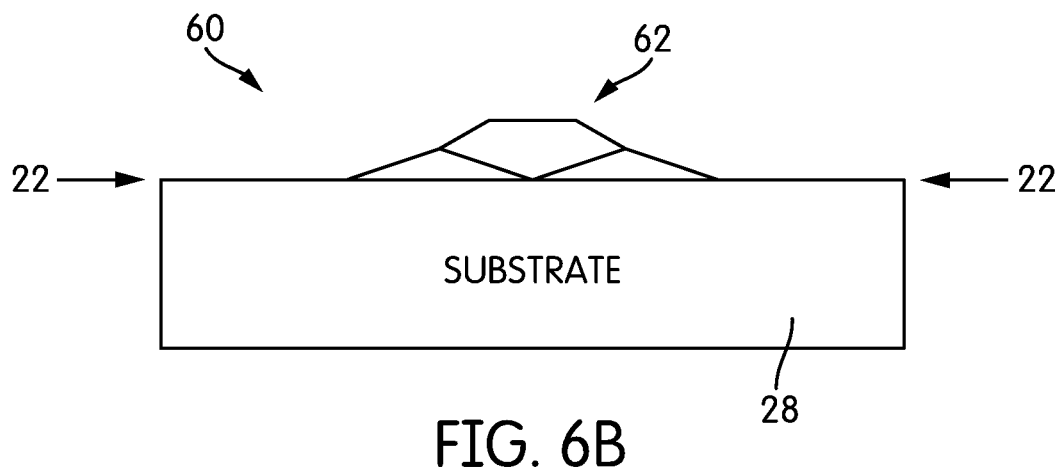

Referring to FIGS. 6-8, the spatial distribution of defects can form out of plane blisters (e.g., bumps) or dimples in the graphene sheet 60, 70, 80. Referring briefly to FIG. 6B, a blister 62 is shown to extend away from a substrate 28, whereas a dimple generally extends towards or into a substrate. According to various embodiments, a blister may have a substantially similar linkage structure as a dimple or may have a substantially different linkage structure than a dimple. Referring to FIG. 6A, a mitosis defect is shown according to an exemplary embodiment. The mitosis defect includes neighboring pentagonal linkages 65, which separate heptagonal linkages 67. Referring to FIG. 6B, the defect forms a blister 62 that extends away from the substrate 28.

Figure 7A:
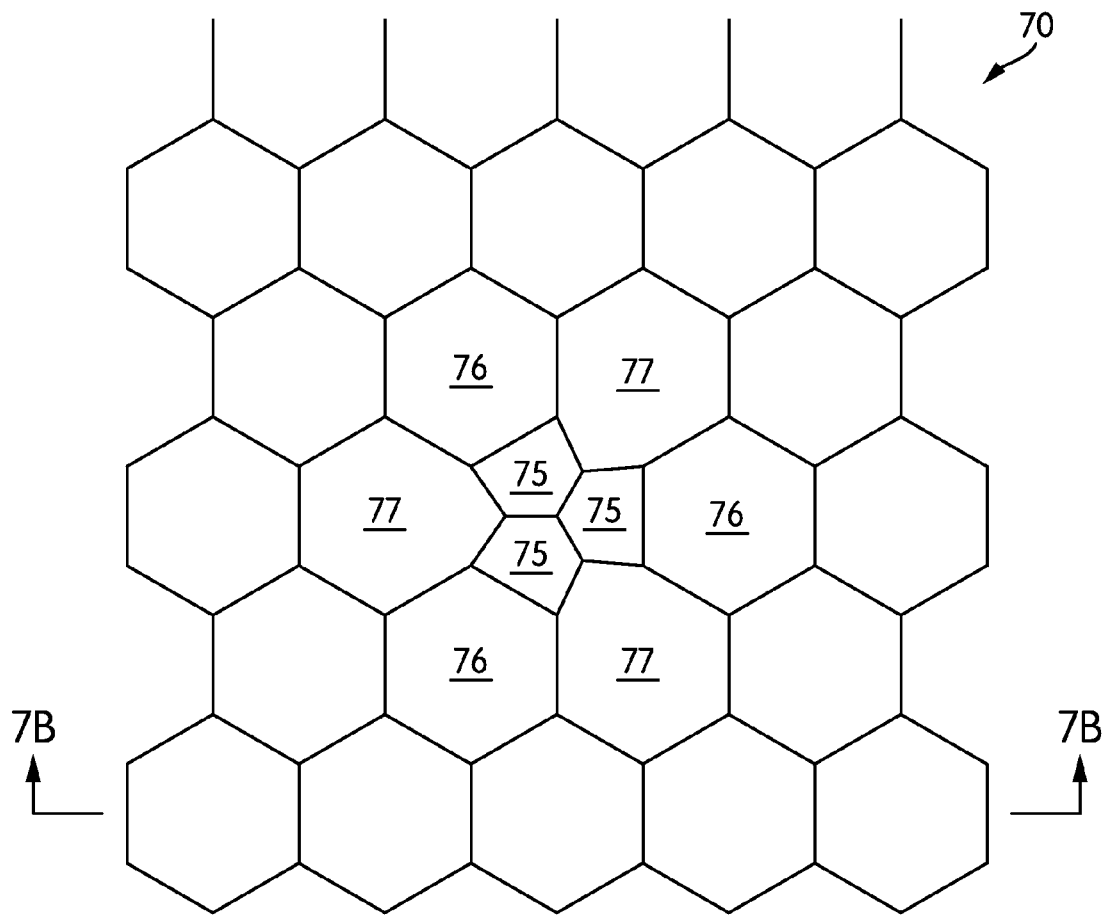
FIGS. 7A-7B are a schematic plan and elevational views, respectively, of a portion of a graphene sheet, shown according to another embodiment.
Figure 7B:
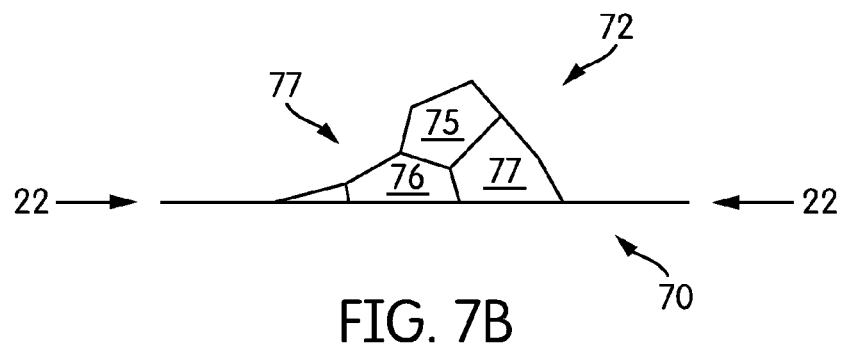

Referring to FIG. 7A, another blister defect is shown according to an exemplary embodiment. As shown, three pentagonal linkages 75 are surrounded by hexagonal linkages 76 and heptagonal linkages 77. FIG. 7B is an elevational view of the graphene sheet 70 of FIG. 7A and shows that these defects extend out of the graphene plane 22 to form a blister 72.

Figure 8A:
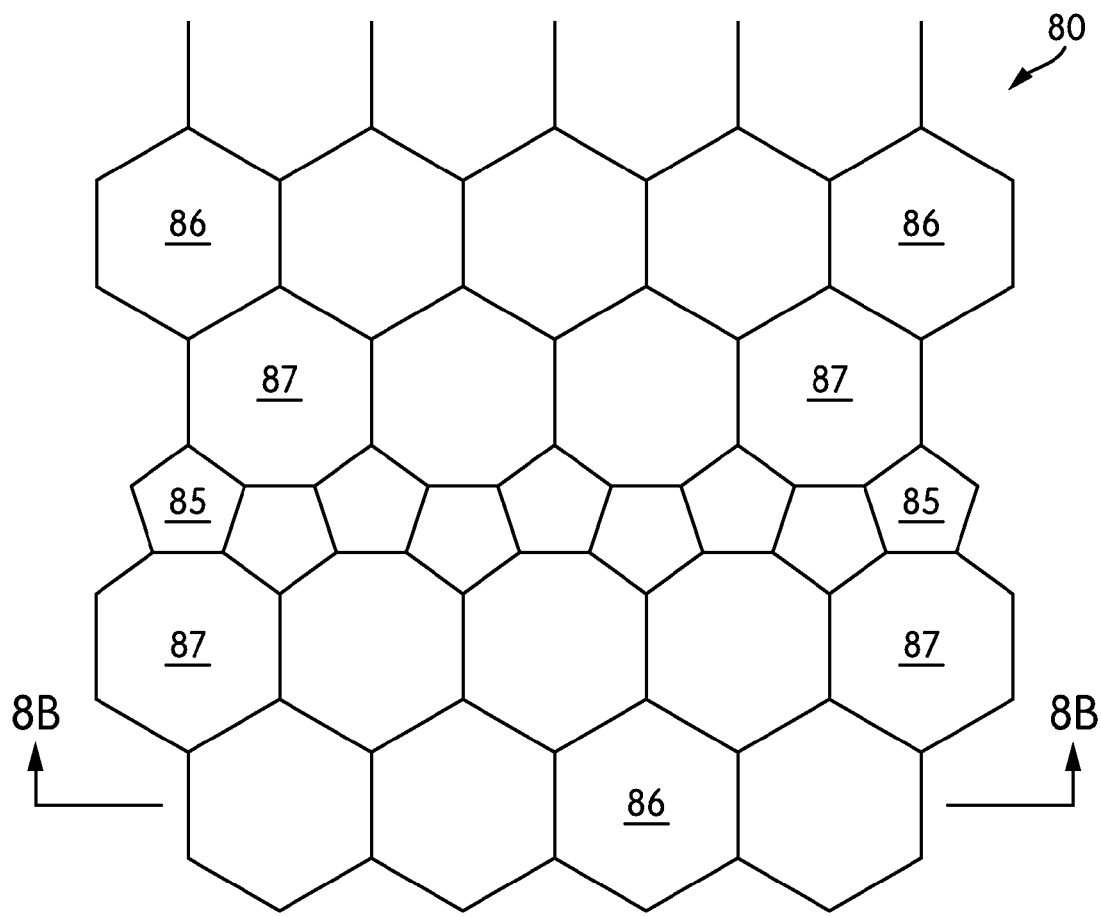
FIGS. 8A-8B are a schematic plan and elevational views, respectively, of a portion of a graphene sheet, shown according to another embodiment.
Figure 8B:
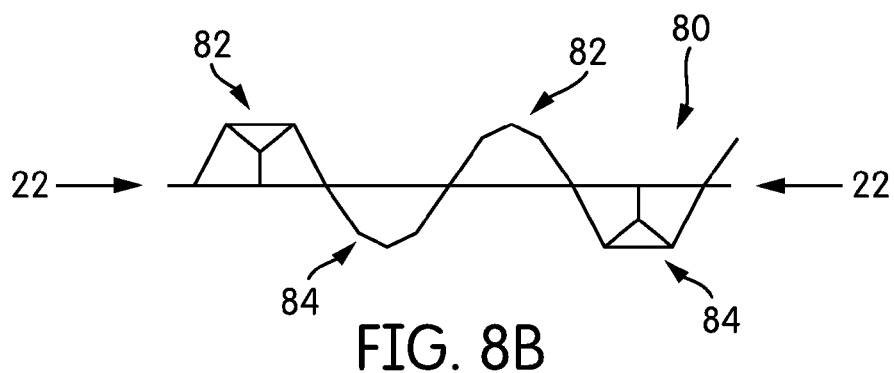

Referring to FIGS. 8A and 8B, a line of pentagonal linkages 85 is shown bounded on each side by rows of heptagonal linkages 87. This spatial distribution of defects extends in an oscillating line of blisters 82 and dimples 84.

The spatial distribution of defects may include one or more out-of-plane formations that extend out of the graphene plane 22 and form a topography on the graphene sheet. The out-of-plane formations may include blisters and/or dimples. The blisters and the dimples may be localized, for example, to include only a few carbon atoms. According to other embodiments, the blisters and dimples may be extensive, including a region of carbon atoms. The topography may be simple, for example, having a single peak or valley as shown in the embodiments of FIGS. 6 and 7. Or, for example, referring to FIG. 8, the topography may be complex having multiple blisters and dimples forming multiple peaks, valleys, and cliffs. According to one embodiment, the out-of-plane formation may include at least one peak and at least two valleys. According to another embodiment, the out-of-plane formation may include at least one valley and at least two peaks. According to yet another embodiment, the out-of-plane formation may include at least two of a peak, a valley, and a cliff. According to various embodiments, an out-of-plane formation may include a larger formation, for example, a fullerene or portions thereof (e.g., a geodesic dome, etc.).

The out-of-plane formations may be used to control global buckling of the graphene sheet. According to one embodiment, the defects may be used to form seed points, i.e., configured to induce buckling at the deformation. For example, a portion of the lattice may be configured to have a weaker structure than the surrounding lattice and, therefore, be susceptible to buckling before the surrounding lattice. According to another embodiment, the defects may be used to confine buckling. For example, a blister may be located at the end of a crease or ridge to inhibit buckling from extending beyond the crease.

According to one exemplary embodiment, a blister may form at least a portion of a buckling site. For example, a blister may be configured to form a dimple upon buckling, or a dimple may be configured to buckle into a blister. Neighboring blister-dimple pairs may be configured to flip. For example, the blister becomes a dimple at approximately the same time as the neighboring dimple becomes a blister.

Referring generally to FIGS. 4-8, the spatial distribution of defects can be configured for various purposes. The spatial distribution of defects may be configured to define a buckling origination site, define the mode shape of the buckling, define a buckling axis, etc. For example, a row of blisters or dimples may be aligned to form a crease or ridge along which the graphene sheet preferably buckles (i.e., susceptible to buckling prior to the neighboring regions of carbon lattice). According to other embodiments, the spatial distribution of defects may be configured to define the extent of the buckling. For example, a defect line may be bounded on each end by defects which inhibit buckling in the graphene sheet from propagating further.

Referring, for example, to FIGS. 4, 6, and 7, the spatial distribution of defects may form a point-like pattern. Referring, for example, to FIGS. 5 and 8, the spatial distribution of defects may form a line-like pattern. According to other embodiments, the defects may form an areal pattern. For example, a pattern of linkages may extend over a region of the graphene sheet, or a fullerene extending out of the graphene plane 22 as a large blister. The spatial patterns may only extend locally, may extend across the entire sheet (e.g., edge to edge, border to border, etc) or along a border or edge. According to one embodiment, the spatial distribution of defects extends from a first edge of the graphene sheet to a second edge of the graphene sheet. According to various embodiments, the second edge may be located adjacent or opposite the first edge of the graphene sheet.

Figure 9:
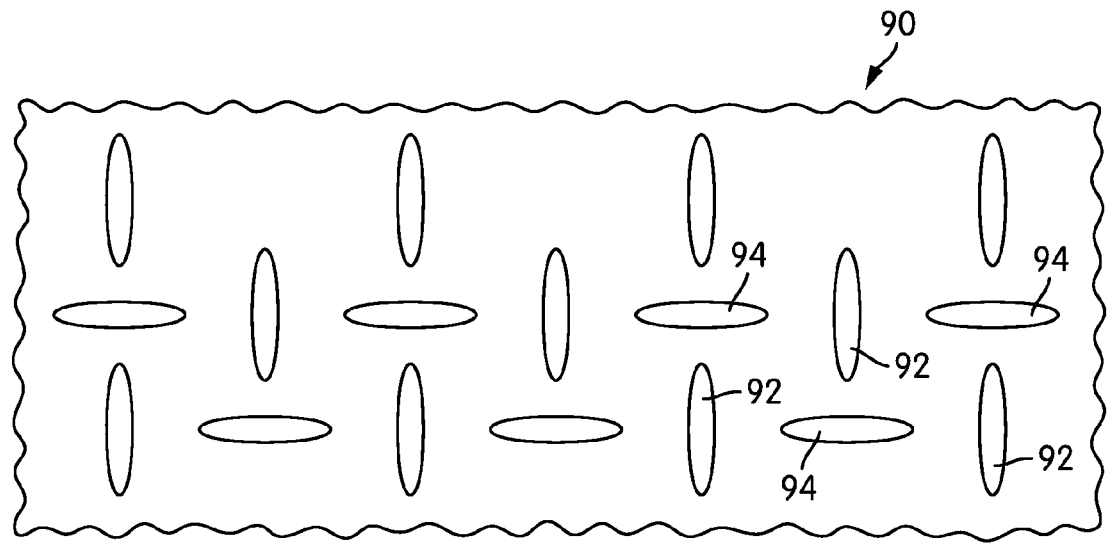
FIG. 9 is a plan view of a spatial distribution of defects in a graphene sheet, shown according to an exemplary embodiment.
Figure 10:
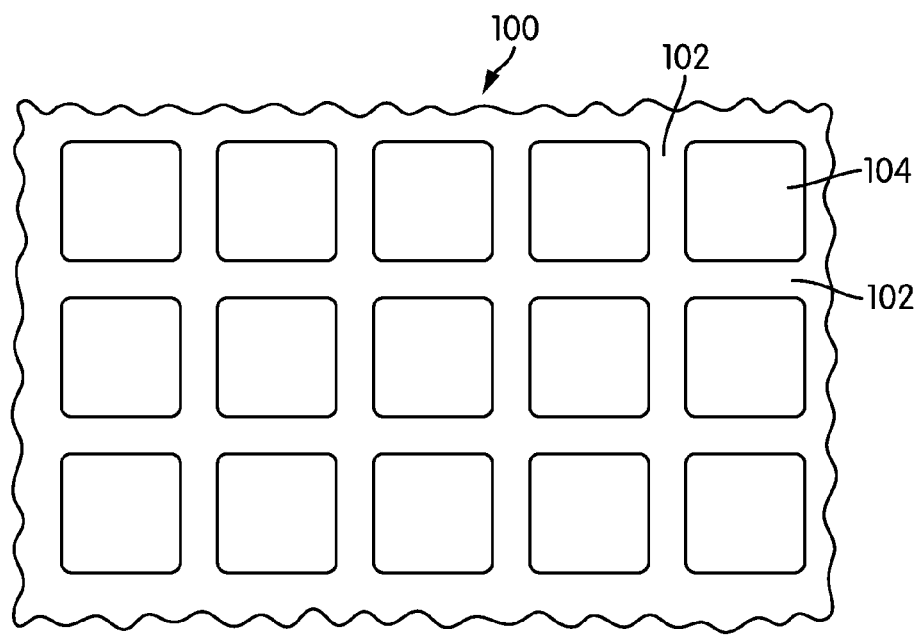
FIG. 10 is a plan view of a spatial distribution of defects in a graphene sheet, shown according to another embodiment.

Referring to FIGS. 9 and 10, a desired defect pattern may be induced by growing the graphene sheet on the topographical template. According to one embodiment, the topographical template may induce a desired spatial distribution of pentagons and heptagons. As described above, the desired spatial distribution of defects may be localized or may spread across regions of the graphene sheet. The spatial distribution may include a plurality of intersecting ridges and valleys that are configured to inhibit buckling of the graphene sheet. Referring to FIG. 9, the graphene sheet 90 may include a first set of blisters 92 oriented in a first planar direction and a second set of blisters 94 oriented in a second planar direction. As shown, the second planar direction is substantially orthogonal or perpendicular to the first planar direction. The resulting pattern may form a diamond plate or tread plate pattern. While graphene sheet 90 includes a plurality of blisters 92, it is contemplated that the distribution of defects may be dimples or a combination of blisters and dimples. According to various embodiments, the spatial distribution may include a regular lattice distribution, for example, having a rectangular or triangular lattice distribution. According to other embodiments, the spatial distribution may include a quasi-periodic lattice distribution, for example, a pentagonal or heptagonal lattice distribution.

Referring to FIG. 10, the topographical template may be used to form a waffle pattern in the graphene sheet 100. For example, the spatial distribution of defects may include intersecting ridges 102 which define a plurality of valleys 104. The waffle pattern may generally inhibit buckling of the graphene sheet. However, it is contemplated that a valley may be formed in the graphene sheet 100 (e.g., in place of a ridge 102) in order to induce buckling along the valley.

Figure 11:
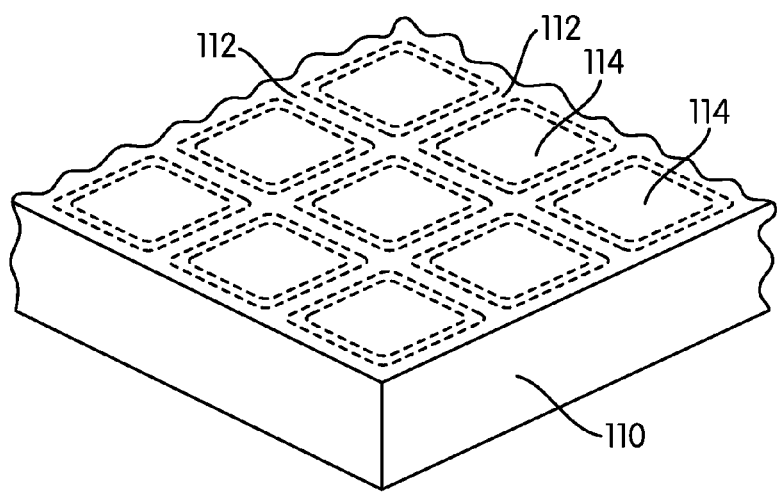
FIG. 11 is a perspective view of a topographical template for inducing a desired spatial distribution of defects in a graphene sheet, shown according to an exemplary embodiment.

Referring to FIG. 11, a topographical template 110 is shown, according to an exemplary embodiment. The topographical template 110 is shown to include a plurality of structures formed (e.g., embossed, debossed, machined, laser etched, chemically etched, etc.) thereon. For example, proud surfaces 112 may cause the formation of peaks or blisters, whereas recessed surfaces 114 may cause the formation of valleys or dimples.

According to one embodiment, the spatial distribution of defects (e.g., blisters, dimples, etc.) can be used to form non-volatile memory bits. These memory bits may be particularly useful in creating re-writable "lock and key" pairs. For example, a user may be denied access to a certain location or information unless the user can provide a graphene sheet having the proper arrangement of blisters and dimples.

Figure 12:
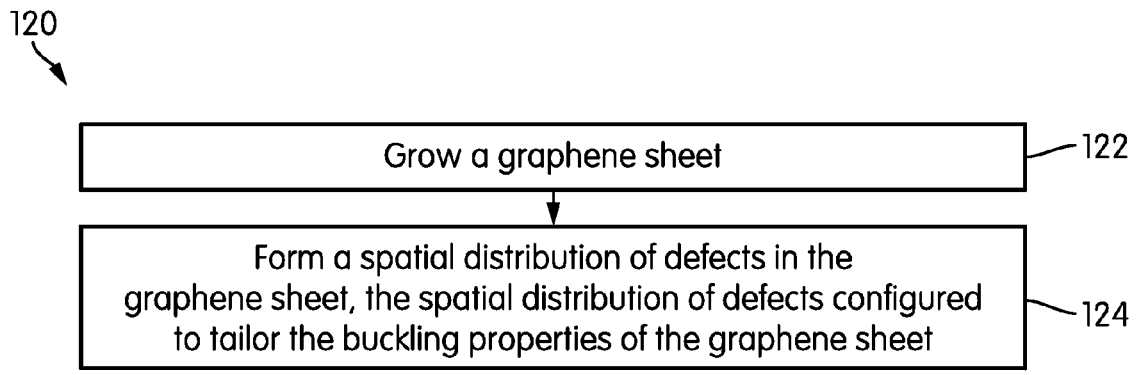
FIG. 12 is a flowchart of a process for tailoring the buckling properties of a graphene sheet, shown according to an exemplary embodiment.

Referring generally to FIGS. 11-14, various methods for tailoring the buckling properties of a graphene sheet are shown in greater detail. Referring to FIG. 12, a flowchart of a process 120 for tailoring the buckling properties of a graphene sheet is shown, according to an exemplary embodiment. Process 120 is shown to include the steps of growing a graphene sheet (step 122) and forming a spatial distribution of defects in the graphene sheet, the spatial distribution of defects configured to tailor the buckling properties of the graphene sheet (step 124).

Figure 13:
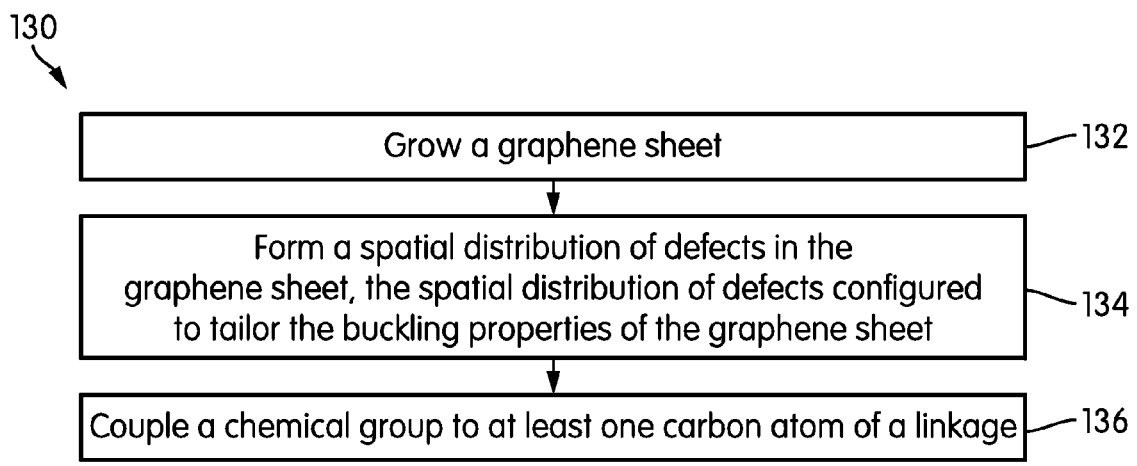
FIG. 13 is a flowchart of a process for tailoring the buckling properties of a graphene sheet, shown according to another embodiment.

Referring to FIG. 13, a flowchart of a process 130 for tailoring the buckling properties of a graphene sheet is shown, according to an exemplary embodiment. Process 130 is shown to include the steps of growing a graphene sheet (step 132), forming a spatial distribution of defects in the graphene sheet, the spatial distribution of defects configured to tailor the buckling properties of the graphene sheet (step 134), and coupling a chemical group to at least one carbon atom of a linkage (step 136).

Figure 14:
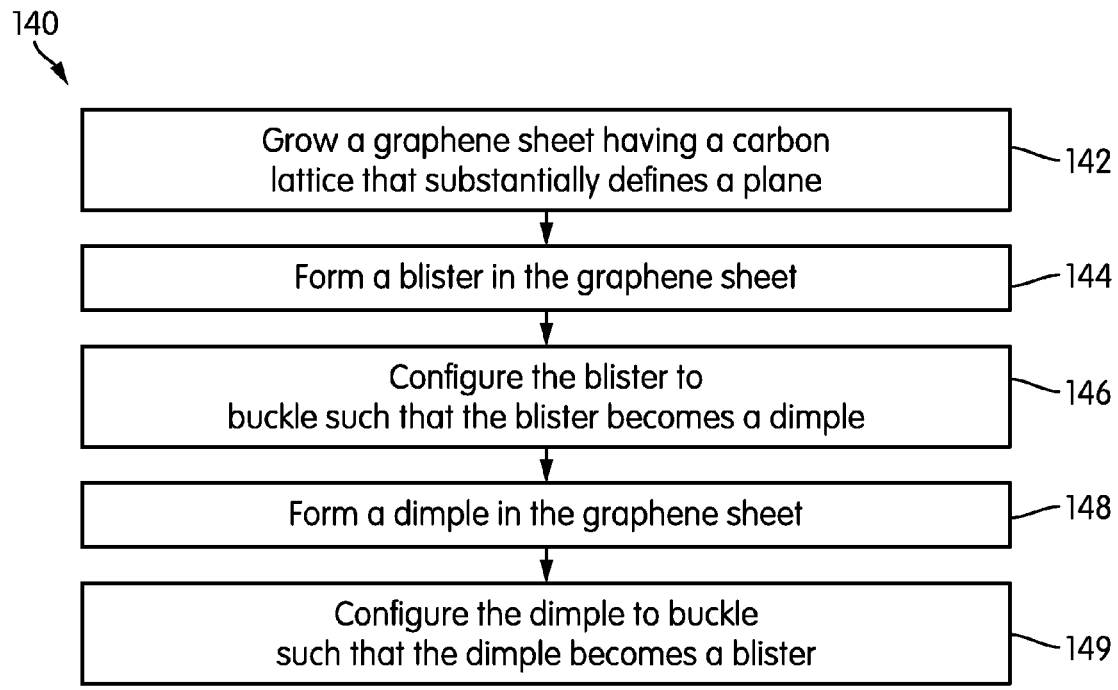
FIG. 14 is a flowchart of a process for tailoring the buckling properties of a graphene sheet, shown according to another embodiment.

Referring to FIG. 14, a flowchart of a process 140 for tailoring the buckling properties of a graphene sheet is shown, according to an exemplary embodiment. Process 140 is shown to include the steps of growing a graphene sheet having a carbon lattice that substantially defines a plane (step 142), forming a blister in the graphene sheet (step 144), configuring the blister to buckle such that the blister becomes a dimple (step 146), forming a dimple in the graphene sheet (step 148), and configuring the dimple to buckle such that the dimple becomes a blister (step 149). According to various embodiments, the process 140 may not include the blister steps (steps 144 and 146) or may not include the dimple steps (steps 148 and 149).

Figure 15:
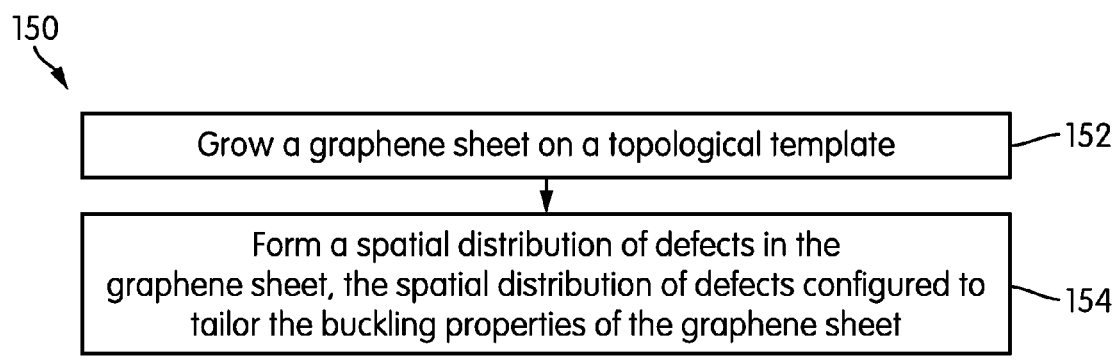
FIG. 15 is a flowchart of a process for tailoring the buckling properties of a graphene sheet, shown according to another embodiment.

Referring to FIG. 15, a flowchart of a process 150 for tailoring the buckling properties of a graphene sheet is shown, according to an exemplary embodiment. Process 150 is shown to include the steps of growing a graphene sheet on a topographical template (step 152) and forming a spatial distribution of defects in the graphene sheet, the spatial distribution of defects configured to tailor the buckling properties of the graphene sheet (step 154).

Turning now to FIGS. 16-27, nanomechanical resonators 160, 170, 180, 190, 200 and methods for controlling the resonant frequencies of the resonators are shown, according to exemplary embodiments. The resonators 160, 170, 180, 190, 200 may be used for filtering electronics, ultrasonic acoustics, or chemical detection. The resonators 160, 170, 180, 190, 200 generally include a graphene sheet 161, 171, 181, 191, 201 at least partially suspended (e.g., supported, coupled so as to allow resonance, attached so as to allow free movement, etc.) from a support structure 162, 172, 182, 192, 202. The graphene sheet includes a carbon lattice that substantially defines a plane and a portion having one or more modes and one or more resonant frequencies. The resonator further includes an actuator 166, 176, 186, 196, 206 configured to control the resonant frequency of a portion of the graphene sheet 161, 171, 181, 191, 201 by actively varying an out-of-plane (e.g., normal, non-coplanar, etc.) force applied to the graphene sheet 161, 171, 181, 191, 201. According to various embodiments, the actuator 166, 176, 186, 196, 206 may apply electrostatic, magnetic, or mechanical out-of-plane forces to the graphene sheet 161, 171, 181, 191, 201. According to one embodiment, the actuator 166, 176, 186, 196, 206 may apply a gas pressure to the graphene sheet. The actuator 166, 176, 186, 196, 206 may be configured to control the resonant frequency of the graphene sheet 161, 171, 181, 191, 201 to a target value. According to one embodiment, the resonant frequency is changed to a new value. According to another embodiment, the resonant frequency is controlled to a reference value in response to an environmental disturbance. According to another embodiment, the resonant frequency is controlled to resonate at a frequency in the radio frequency (RF) or microwave spectra. According to yet another embodiment, the resonator 160, 170, 180, 190, 200 may be configured to detect a variety of molecular scale entities that bind (reversibly or, preferably, irreversibly) to the graphene sheet 161, 171, 181, 191, 201 or to chemical functional groups 20 functionalized thereon.

Figure 16:
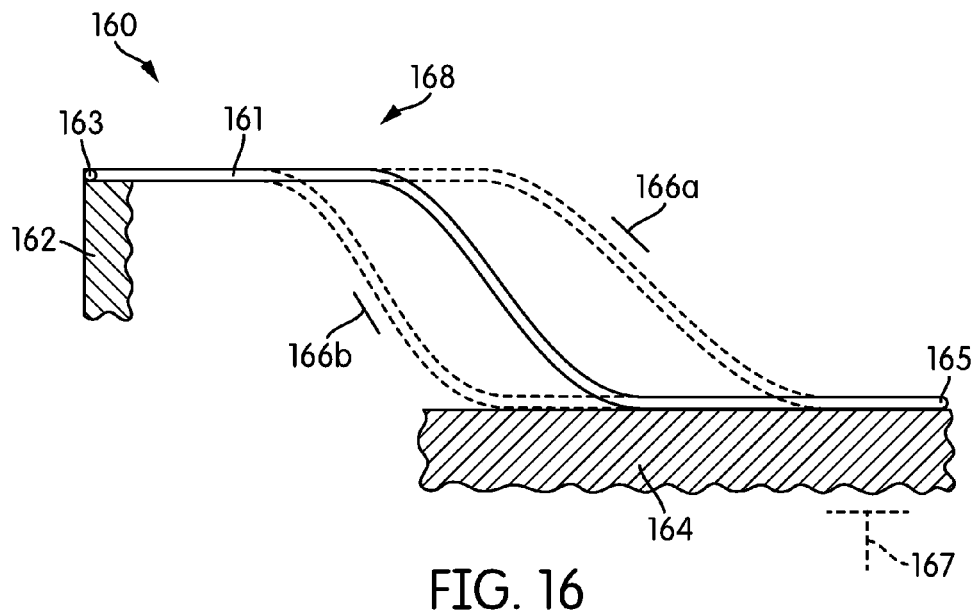
FIG. 16 is a schematic elevational view of a nanomechanical resonator, shown according to an exemplary embodiment.

Referring to FIG. 16, a resonator 160 is shown according to an exemplary embodiment. The graphene sheet 161 includes a first end 163, which is supported by a first support structure 162, and a second end 165 that is disposed opposite the first end and loosely coupled to a second support structure 164. The second end 165 of the graphene sheet 161 may be mechanically coupled to the second support structure 164. According to the embodiment shown, the graphene sheet 161 is cantilevered from the first support structure 162, and an actuator 167 applies a force (e.g., electrostatic, magnetic, etc.) to the graphene sheet 161, causing the graphene sheet 161 to deflect (e.g., elastically deform, buckle, etc.) such that the graphene sheet 161 couples to the second support structure. According to another embodiment, the graphene sheet 161 may be formed to generally have a curvilinear shape. A first actuator 166*a* and a second actuator 166*b* are shown to apply an out-of-plane force (e.g., electrostatic, magnetic, etc.) to the graphene sheet 161 that varies the resonant frequency of the graphene. For example, the first actuator 166*a* may apply an attractive force to the graphene sheet 161, causing an unsupported portion 168 of the graphene sheet 161 to increase in length and, thereby, decrease in resonant frequency. The second actuator 166*b* may apply an attractive force to the graphene sheet 161, causing an unsupported portion 168 of the graphene sheet 161 to decrease in length and, thereby, increase in resonant frequency. According to one embodiment, a single actuator 166 may be configured to both attract and repel the graphene sheet 161, for example, by applying the same (to repel) or opposite (to attract) polarity as the graphene sheet 161.

Figure 17:
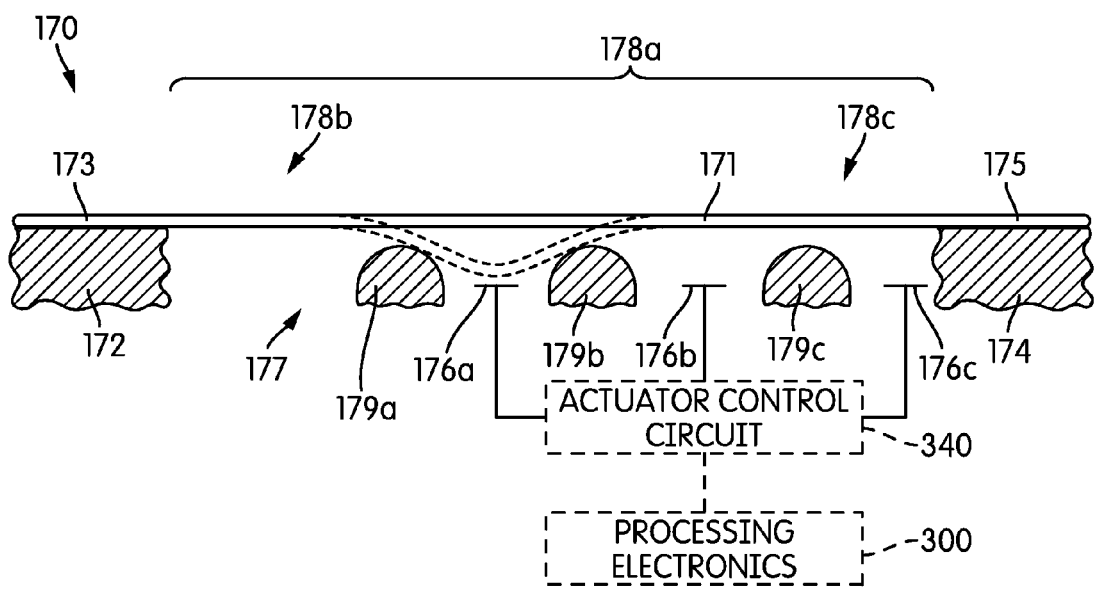
FIG. 17 is a schematic elevational view of a nanomechanical resonator, shown according to another embodiment.

Referring to FIG. 17, a resonator 170 is shown according to an exemplary embodiment. The graphene sheet 171 includes a first end 173, which is supported by a first support structure 172, and a second end 175 that is disposed opposite the first end and coupled to a second support structure 174. As shown, the graphene sheet 171 forms a bridge having an unsupported portion 178a over a trench 177. For graphene sheets that are suspended over a trench, the spring constant of the graphene sheet is determined by the aggregate carbon bond-compliance at the trench-edge, and the mass is determined by the total number of atoms across the trench. First through third actuators 176a, 176b, 176c are shown interspaced between third through fifth support structures (e.g., wall, dampers, frets, etc.), shown as first through third posts 179a, 179b, 179c. According to the exemplary embodiment shown, the actuator 176 (e.g., first actuator 176a) may apply an attractive out-of-plane force that couples the graphene sheet to one or more of the posts 179 (e.g., first post 179a and second post 179b. As shown, coupling the graphene sheet 171 to the first and second posts 179a, 179b effectively splits the unsupported portion 178a into first and second unsupported sub-portions 178b, 178c. The shorter lengths of the first and second sub-portions 178b, 178c relative to the unsupported portion 178a raises the resonant frequency of the sub-portions of the graphene sheet 171. Further, coupling the graphene sheet 171 to a post 179 is intended to change the mode of the resonant portion of the graphene sheet. According to the embodiment shown, deactivating the first actuator 176a and actuating the second actuator 176b decouples the graphene sheet 171 from the first post 179a and couples the graphene sheet 171 to the third post 179c. Accordingly, the first sub-portion 178b increases in length and decreases in resonant frequency, and the second sub-portion decreases in length and increases in resonant frequency. The mode of the resonant portion is intended to change depending on the geometry of other forces and support structures. It is further contemplated that multiple actuators 176 may be operated concurrently or with varying force to generate additional combinations of modes and resonant frequencies in the graphene sheet 171.

Figure 18:
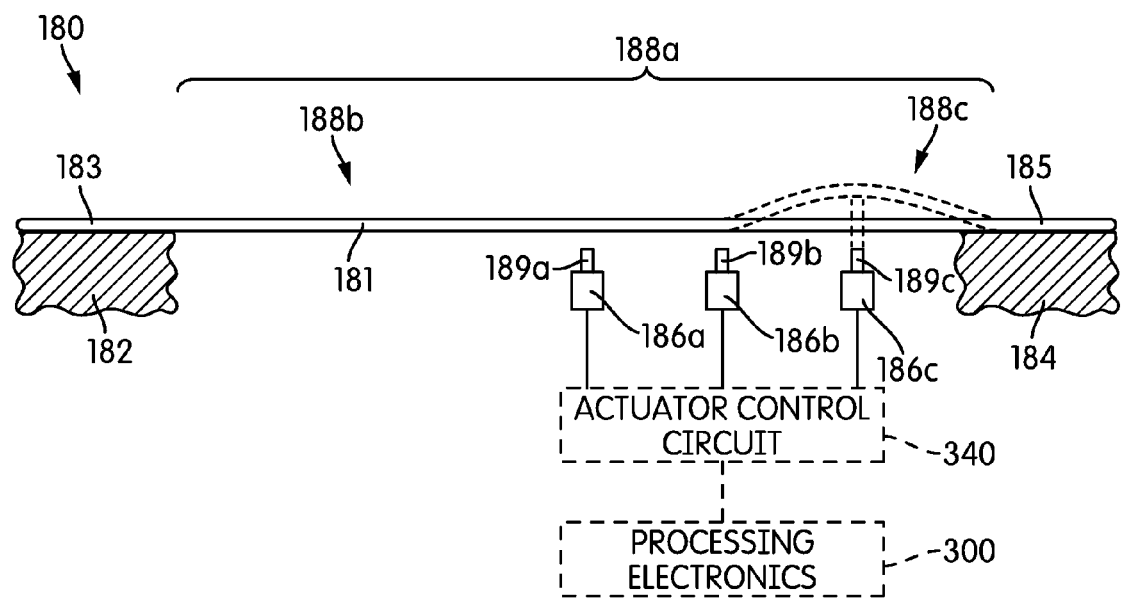
FIG. 18 is a schematic elevational view of a nanomechanical resonator, shown according to another embodiment.

Referring to FIG. 18, a resonator 180 is shown according to an exemplary embodiment. The graphene sheet 181 includes a first end 183, which is supported by a first support structure 182, and a second end 185 that is disposed opposite the first end and coupled to a second support structure 184. The embodiment shown is structurally similar to the embodiment of FIG. 17; however, first through third actuators 186a, 186b, 186c may be an actuator which physically moves a contact tip relative to the plane (e.g., an extensible actuator, a piezoelectric actuator, a MEMS actuator, electromagnetic actuator, etc.). First through third posts 189a, 189b, 189c are coupled to the first through third actuators 186a, 186b, 186c such that operation of the actuator 186 causes the post 189 to move toward and couple to the graphene sheet 181. Varying the out-of-plane force applied by the actuators 186 varies (e.g., increases, decreases) the out of plane coupling of the graphene sheet 181 and the posts 189.

As described above with reference to FIG. 18, one or more actuators 186 may be operated to couple of one or more posts 189 to the graphene sheet 181, thereby controlling the resonant frequencies and the modes of the graphene sheet 181. That is, the out-of-plane forces may be varied to control the support boundary conditions, and hence the vibrational modes and frequencies. For example, coupling a post 189 to the graphene sheet 181 can decrease the unsupported length 188 of the graphene sheet 181, acting like a fret on a guitar. According to another embodiment, the out-of-plane forces may increase the unsupported length, for example, lifting the graphene sheet off of a support structure. The variations can be uniform over a width or perimeter of the graphene 181, or can be isolated to one or more regions. Once the post 189 couples to the graphene sheet 181, the force applied by the actuator 186 can be increased or decreased to change the resonant frequencies in the graphene sheet 181.

Figure 28:
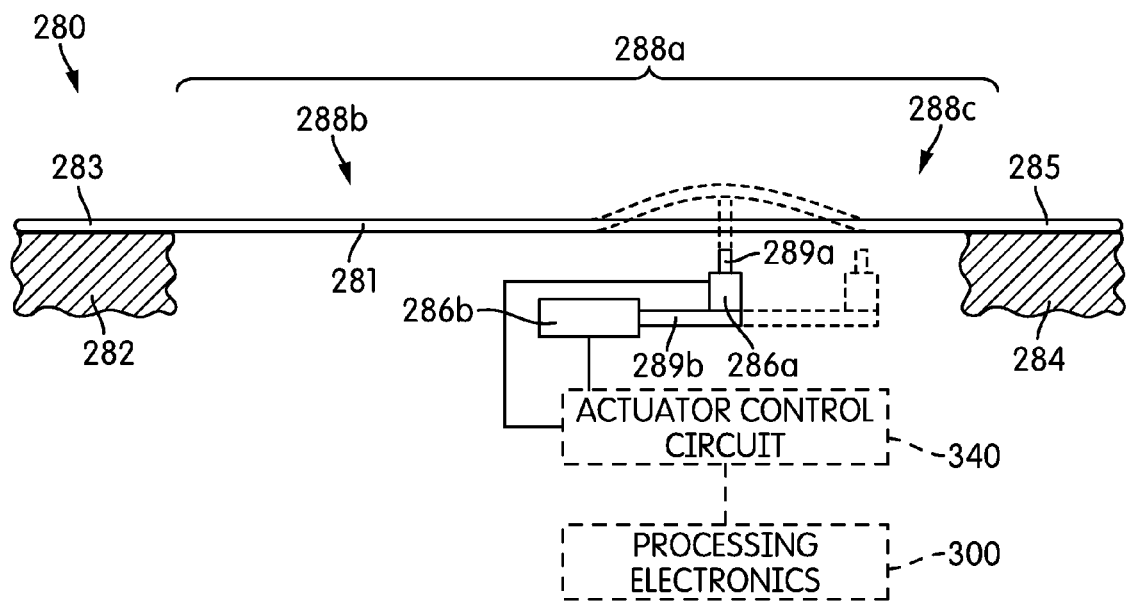
FIG. 28 is a schematic elevational view of a nanomechanical resonator, shown according to another embodiment.

Referring to FIG. 28, a resonator 280 is shown according to an exemplary embodiment. The graphene sheet 281 includes a first end 283, which is supported by a first support structure 282, and a second end 285 that is disposed opposite the first end and coupled to a second support structure 284. The embodiment shown is structurally similar to the embodiments of FIGS. 17 and 18; however, a second actuator 286b is configured to move a first actuator 286a relative to the graphene sheet 281. As shown, a first post 289a is coupled to the first actuator 286a such that operation of the actuator 286a causes the post 289a to move toward and couple to the graphene sheet 281, and a second post 289b is coupled to the second actuator 286b such that operation of the actuator 286b causes the post 289b, and the first actuator 286a coupled thereto, to move relative to the graphene sheet 281. Varying the location and out-of-plane force applied by the first actuator 286a varies (e.g., increases, decreases) the can change the resonant frequencies of the graphene sheet 281. That is, the out-of-plane forces and the location of the out-of-plane forces may be varied to control the support boundary conditions, and hence the vibrational modes and frequencies. For example, coupling a post 289a to the graphene sheet 281 can decrease the unsupported length 288 of the graphene sheet 281. According to another embodiment, the out-of-plane forces may increase the unsupported length 288, for example, lifting the graphene sheet off of a support structure. The variations can be uniform over a width or perimeter of the graphene 181, or can be isolated to one or more regions. According to various embodiments, the first and second actuators 286 may apply attractive and repulsive forces such as the actuators 176 in FIG. 17, may physically move a post 289 (as shown) such as the actuators 186 in FIG. 18, or any combination thereof. Motion of the posts 289 may be linear (e.g., along a longitudinal axis) or rotational (e.g., where a second end of the post 289 sweeps an arc about a first end of the post). While only one actuator pair 286, 289 is shown, it is contemplated that multiple pairs may be used or that multiple first actuators 286a may be coupled to an second actuator 286b.

Figure 19A:
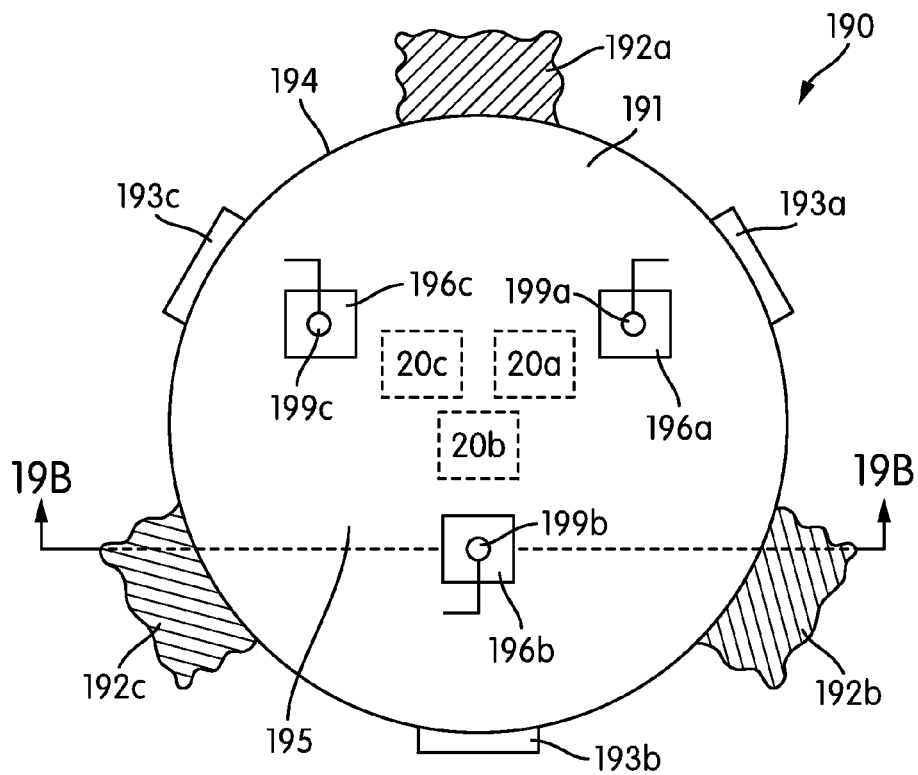
FIGS. 19A-19B are schematic plan and elevational views, respectively, of a nanomechanical resonator, shown according to another embodiment.
Figure 19B:
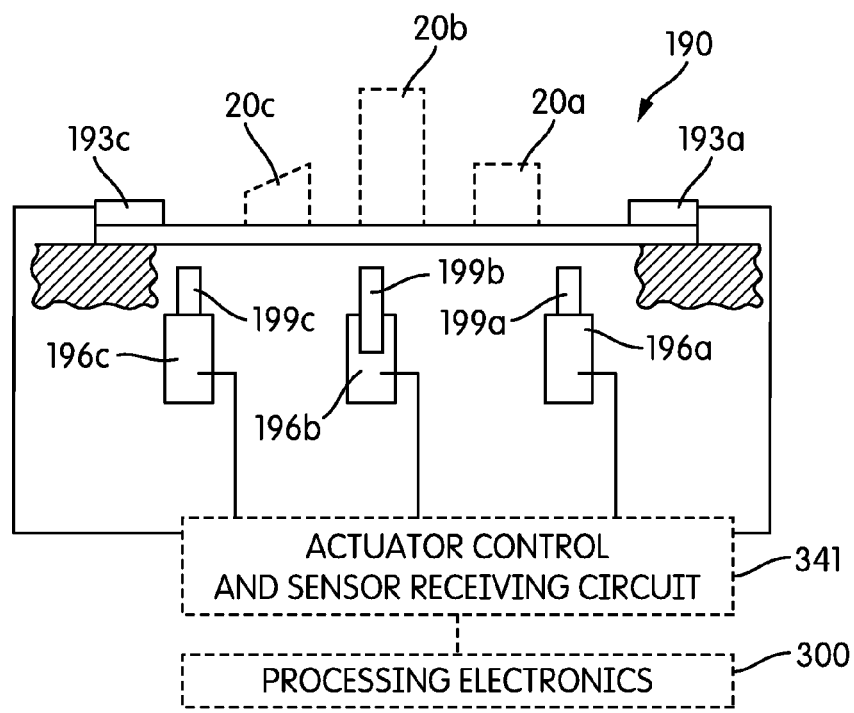

Referring to FIGS. 19A and 19B, a plan view and an elevational view, respectively, of a resonator 190 is shown according to an exemplary embodiment. A graphene sheet 191 of substantially circular shape is supported around the perimeter by first through third support structures 192a, 192b, 192c. According to other embodiments, the graphene sheet may be rectangular, polygonal (e.g., triangular, pentagonal, hexagonal, etc.), oval, or any other suitable shape. As shown, the graphene sheet 191 forms drum head between the support structures 192, and the length and width dimensions are of the graphene sheet 191 are comparable (e.g., within a factor of 2). The graphene sheet 191 is shown to be suspended from three support structures 192, which are substantially equally spaced about the perimeter of the graphene sheet 191, and provide a free surface 194 along the perimeter of the graphene sheet 191. The graphene sheet 191 is further shown to have a free inner surface 195. According to various other embodiments the graphene sheet 191 may be suspended from any number of support structures 192, which may or may not be evenly spaced about the perimeter. According to one embodiment, the graphene sheet 191 may be suspended from one or more support structures 192 that fully support the graphene sheet about its perimeter. According to other embodiments, the inner surface may be supported by one or more support structures 192. According to one embodiment, the resonator may be supported by support structures 192 under the inner surface 194, leaving the entire perimeter as a free surface.

The resonator 190 is further shown to include first through third actuators 196a, 196b, 196c, shown as piezoelectric actuators. First through third posts 199a, 199b, 199c are coupled to the first through third actuators 196a, 196b, 196c such that operation of the actuator 196 causes the post 199 to move towards and couple to the graphene sheet 191. One or more actuators 196 may be operated to couple of one or more posts 199 to the graphene sheet 191, thereby controlling the resonant frequencies and the modes of the graphene sheet 191.

The resonator 190 is shown to include first through third sensors 193a, 193b, 193c disposed about the graphene sheet 191. The sensors 193 may be of any suitable type to measure the resonance of the graphene sheet 191, for example, a piezoelectric sensor, an acoustic sensor (e.g., ultrasonic), an optical sensor (e.g., laser displacement sensor), a capacitive sensor, etc. The sensors 193 are shown to be interspaced between the support structures 192 along the graphene plane 22, but may be located proximate the support structures 192 and may be located out-of-plane from the graphene sheet 191. According to various embodiments, there could be any number of sensors 193.

According to an exemplary embodiment, a plurality of functional groups 20a, 20b, 20c are functionalized on the graphene sheet 191 and are configured to react with or to be attracted to a molecule that is desired to be detected. The interaction of the detected molecule and the functional group 20 may affect the resonance of the graphene sheet 191, which may be detected by the sensors 193. However, the sensors may not be able to detect which functional group 20 is being activated due to symmetries. For example, the graphene sheet may have multiple modes. One or more actuators 196 may be operated to split the modes and change the resonant frequencies of the graphene sheet 191 such that the sensors 193 or processing electronics may determine which functional group 20 is activated. According to one embodiment, each actuator 196 may be operated in sequence to enable processing electronics 300 to collect several data points or sets from the sensors 193 in order to identify the activated functional group 20. According to one embodiment, the sensors 193 may detect or measure the change in resonant frequency of the graphene sheet 191. According to another embodiment, servo tensioners may be used to maintain a constant frequency on the graphene sheet, and sensors 193 may measure the force required to maintain the resonant frequency.

Multiply supported graphene resonators, for example, resonator 190, may be subject to in-plane stress fields. The in-plane stress field may be purely tensile or compressive, or may include shear components. The stress-field may be isotropic or anisotropic. The resonator and actuator(s) may be configured such that the out-of-plane control forces interact with the in-plane stress field in order to modify the resonator modes and the resonant frequency.

The graphene sheets 160, 170, 180, 190, 200 described herein are substantially two-dimensional graphene sheets. Accordingly, the modes and resonant frequencies of the graphene sheet may propagate in a plurality of directions. Thus, the out-of-plane forces applied to the graphene sheets control a plurality of resonant frequencies in a plurality of directions.

Referring to FIGS. 20A-20E, a plan view and several elevational views of a resonator 200 are shown according to an exemplary embodiment. The resonator includes a graphene sheet 201, which in turn includes a first end 203 and a second end 205. The first end 203 is supported by a first support structure 202, and the second end 205 is a free end, such that the graphene sheet 201 is cantilevered from the first support structure 202. Accordingly, the graphene sheet 201 has a first resonant portion 208. The graphene sheet 201 further includes one or more buckling locations 204, shown as first through third buckling locations 204a, 204b, 204c. As shown, the graphene sheet 201 is ribbon-like, having a length dimension that is much greater than the width dimension. According to one embodiment, the length dimension is at least three times the width dimension. Preferably, the length dimension is at least ten times the width dimension. As shown, the graphene sheet 201 has sufficient width to support a lateral mode.

Figure 20A:
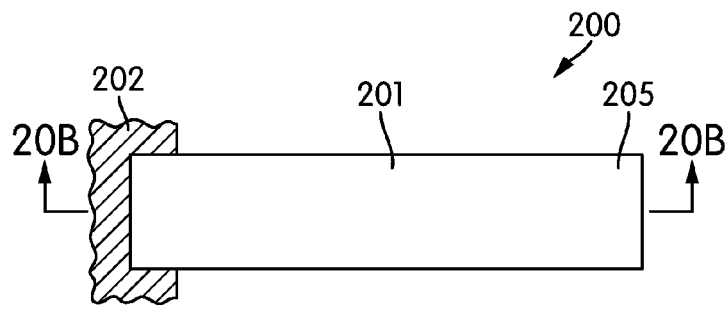
FIGS. 20A and 20B-20E are schematic plan and elevational views, respectively, of a nanomechanical resonator, shown according to another embodiment.
Figure 20B:
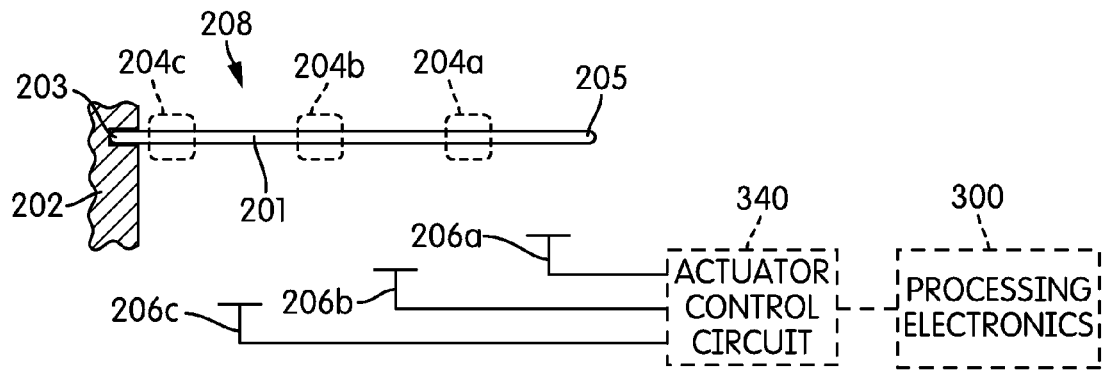
Figure 20C:
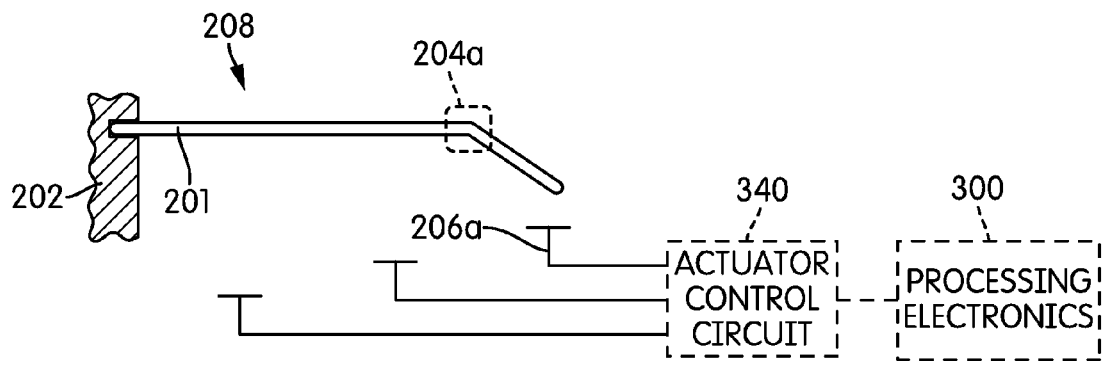
Figure 20D:
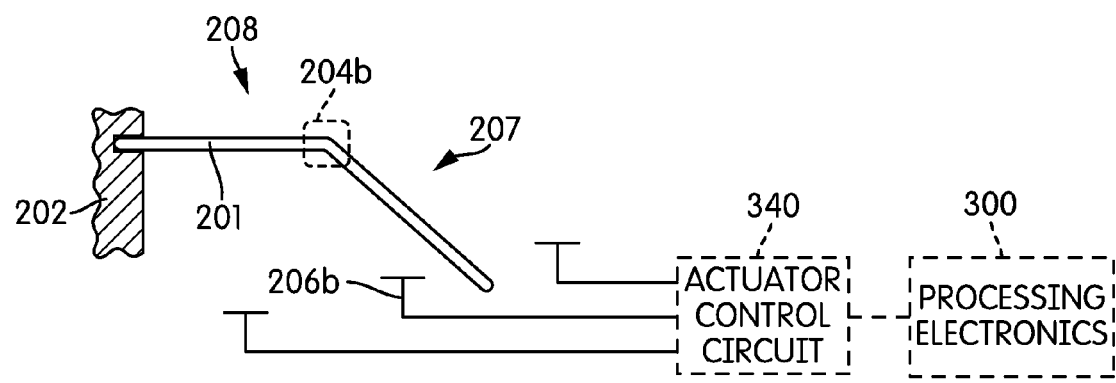
Figure 20E:
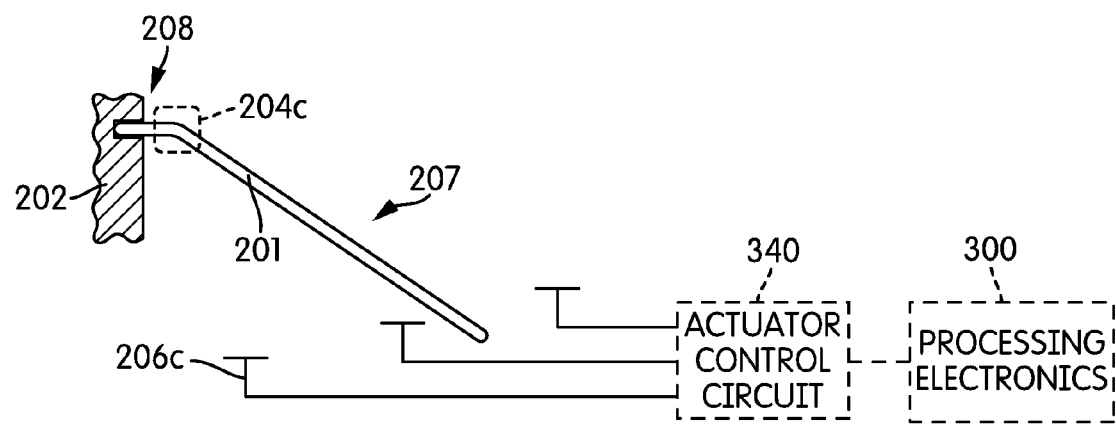

The resonator 201 is shown to include first through third actuators 206a, 206b, 206c, which are configured to apply an attractive force to portions of the graphene sheet 201. As shown in FIG. 20C, operating the first actuator 206a causes the graphene sheet 201 to buckle at the first buckling location 204a, which shortens the length of the resonant portion 208 of graphene sheet 201 and raises the resonant frequency. As shown in FIG. 20D, operating the second actuator 206b causes the graphene sheet 201 to buckle at the second buckling location 204b, which further shortens the length of the resonant portion 208 of graphene sheet 201 and raises the resonant frequency. Buckling the graphene sheet 201 may also change the mode of the graphene sheet 201, for example, a second portion 207 of the graphene sheet 201 distal the buckling location 204 from the support structure 202 may generate additional vibrational modes and frequencies. As shown in FIG. 20E, operating the third actuator 206c causes the graphene sheet 201 to buckle at the third buckling location 204c, which further shortens the length of the resonant portion 208 of graphene sheet 201 and further raises the resonant frequency. The graphene sheet 201 may be configured to resiliently return to an unbuckled state when the attractive forces from the actuators 206 are removed. According to other embodiments, the actuators 206 may be configured to push the graphene sheet 201 back towards an unbuckled state, or the resonator 200 may include additional actuators 206 configured to push or pull the graphene sheet 201 back to an unbuckled state. According to other embodiments, multiple actuators 206 may operate on the graphene sheet 201 at the same time in order to generate desired buckling, mode, and resonant frequency responses.

The techniques described above with regard to the spatial distribution of defects may be used to tailor the buckling properties of the graphene sheet 201. For example, one or more defects may be formed at buckling locations 204 to induce the graphene sheet 201 to buckle at desired locations, wherein buckling at the desired locations causes known and desired resonant frequencies and modes. According to another embodiment, the second end 205 of the graphene sheet 201 may be supported by a second support, such that the graphene sheet forms a bridge (see, e.g., FIGS. 17 and 18). Application of out-of-plane forces on the graphene sheet 201 would cause buckling of the graphene sheet 201 between the support structures.

Figure 21:
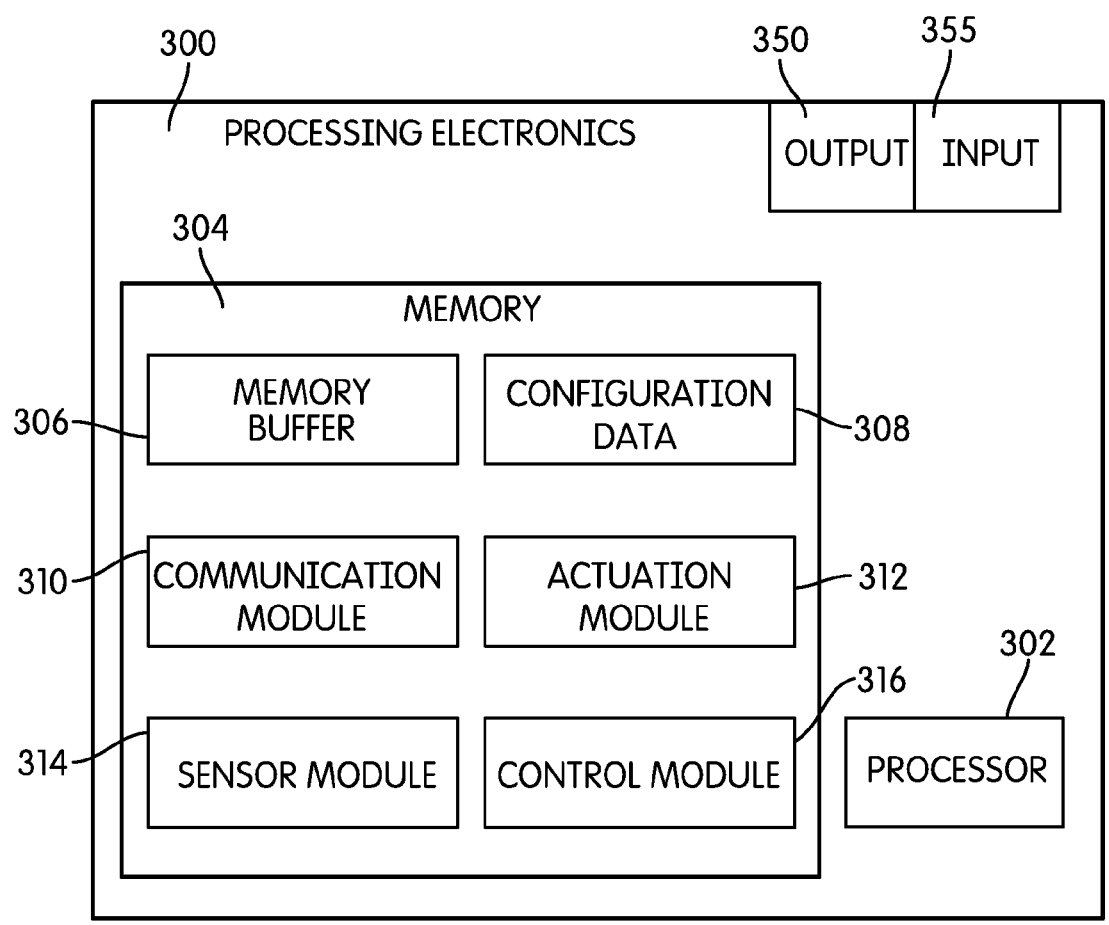
FIG. 21 is a block diagram of processing electronics, shown according to an exemplary embodiment.

Referring to FIG. 21, a detailed block diagram of processing electronics 300 of FIGS. 16-20 is shown, according to an exemplary embodiment. Processing electronics 300 includes a memory 304 and processor 302. Processor 302 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 302 is configured to execute computer code stored in memory 304 to complete and facilitate the activities described herein. Memory 304 can be any volatile or non-volatile memory device capable of storing data or computer code relating to the activities described herein. For example, memory 304 is shown to include modules 310-316 which are computer code modules (e.g., executable code, object code, source code, script code, machine code, etc.) configured for execution by processor 302. When executed by processor 302, processing electronics 300 is configured to complete the activities described herein. Processing electronics includes hardware circuitry for supporting the execution of the computer code of modules 312-316. For example, processing electronics 300 includes hardware interfaces (e.g., output 350) for communicating control signals (e.g., analog, digital) from processing electronics 300 to the circuit 340, 341. Processing electronics 300 may also include an input 355 for receiving, for example, feedback signals from circuit 340, 341, sensor data from circuit 341, or for receiving data or signals from other systems or devices.

Memory 304 includes a buffer 306 for receiving actuator feedback signals and sensor data. The signals (or representations thereof) and data may be stored in memory buffer 306 until buffer 306 is accessed for data. For example, actuation module 312, a sensor module 314, a control module 316, or another process that utilizes actuator feedback signals or sensor data may access buffer 306. The feedback signals and sensor data may be stored in any suitable format.

Memory 304 further includes configuration data 308. The configuration data 308 includes data relating to the actuators 166, 176, 186, 196, 206 and the sensors 193. For example, the configuration data 308 may include transfer functions, electromagnetic response information, electrostatic response information, gas flow information, information regarding the location and orientation of the actuators, or any other information necessary to control the actuators 166, 176, 186, 196, 206. The configuration data may also include transfer functions, stress-strain functions, Doppler information, information regarding the location and orientation of the sensors, or any other information necessary to interpret the data from the sensors 193.

Memory 304 further includes an actuation module 312. The actuation module 312 includes instructions for causing the actuation of the actuators 166, 176, 186, 196, 206. For example, the actuation module may output commands to the actuators 166, 176, 186, 196, 206 (e.g., via output 350) and may receive actuator feedback from the memory buffer 306 or input 355. The actuation module 312 may be configured to receive commands from the control module 316. The actuation module may be further configured to use data from the configuration data 308 to control the actuators.

Memory 304 further includes a sensor module 314. The sensor module 312 includes instructions for interpreting sensor data. The sensor module 312 may be configured to use data from the configuration data 308 to convert sensor data from memory buffer 306 into a format useable by other modules, for example, the control module 316 or a display module.

Memory 304 further includes a control module 316. The control module 316 includes instructions for controlling the actively controlling the resonance frequency of the graphene sheet. The control module may be configured to receive sensor data (e.g., from sensor module 314, memory buffer 306, or input 355) and actuator feedback information (e.g., from actuation module 312, memory buffer 306, or input 355), to determine an appropriate correction factor, and to output the appropriate command to the actuator 166, 176, 186, 196, 206, either directly via output 350 or indirectly through actuation module 312. The control module 316 may be configured to control the resonant frequency of the graphene sheet to a target value. According to one embodiment, the resonant frequency is changed to a new value. According to another embodiment, the resonant frequency is controlled to a reference value in response to an environmental disturbance.

Figure 22:
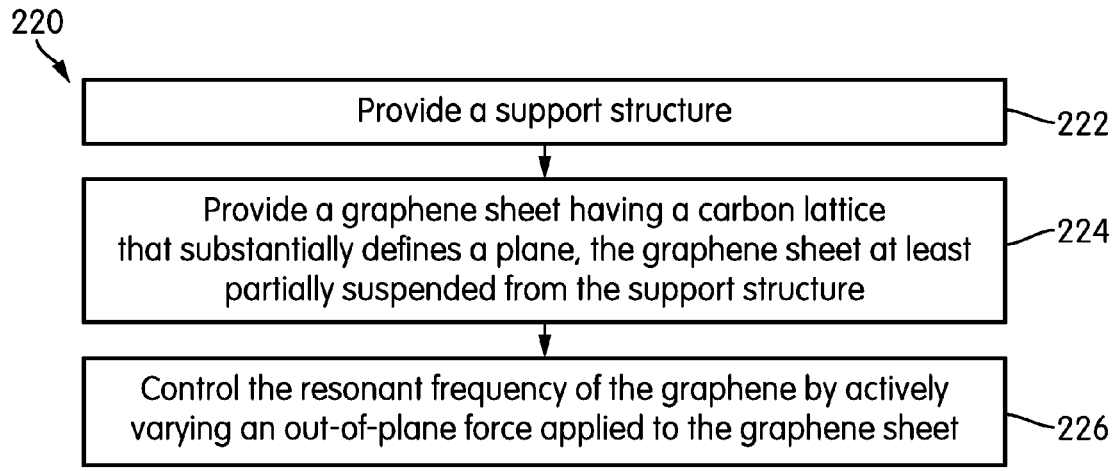
FIG. 22 is a flowchart of a process for controlling the resonant frequency of a suspended graphene nanomechanical resonator, shown according to an exemplary embodiment.

Referring generally to FIGS. 22-27, various methods for controlling the resonant frequency of a suspended graphene nanomechanical resonator are shown in greater detail. Referring to FIG. 22, a flowchart of a process 220 for controlling the resonant frequency of a suspended graphene nanomechanical resonator is shown, according to an exemplary embodiment. Process 220 is shown to include the steps of providing a support structure (step 222), providing a graphene sheet having a carbon lattice that substantially defines a plane, the graphene sheet at least partially suspended from the support structure (step 224), and controlling the resonant frequency of the graphene by actively varying an out-of-plane force applied to the graphene sheet (step 226).

Figure 23:
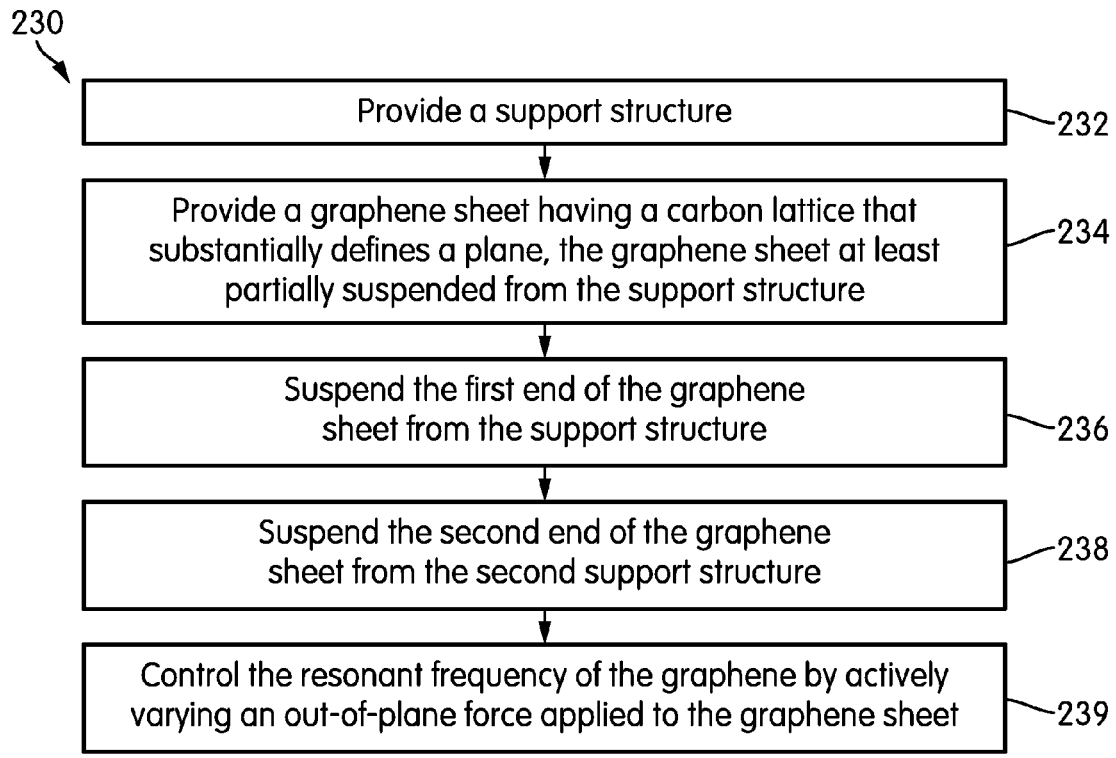
FIG. 23 is a flowchart of a process for controlling the resonant frequency of a suspended graphene nanomechanical resonator, shown according to another embodiment.

Referring to FIG. 23, a flowchart of a process 230 for controlling the resonant frequency of a suspended graphene nanomechanical resonator is shown, according to an exemplary embodiment. Process 230 is shown to include the steps of providing a support structure (step 232), providing a graphene sheet having a carbon lattice that substantially defines a plane, the graphene sheet at least partially suspended from the support structure (step 234), suspending the first end of the graphene sheet from the support structure (step 236), suspending the second end of the graphene sheet from the second support structure (step 238), and controlling the resonant frequency of the graphene by actively varying an out-of-plane force applied to the graphene sheet (step 239).

Figure 24:
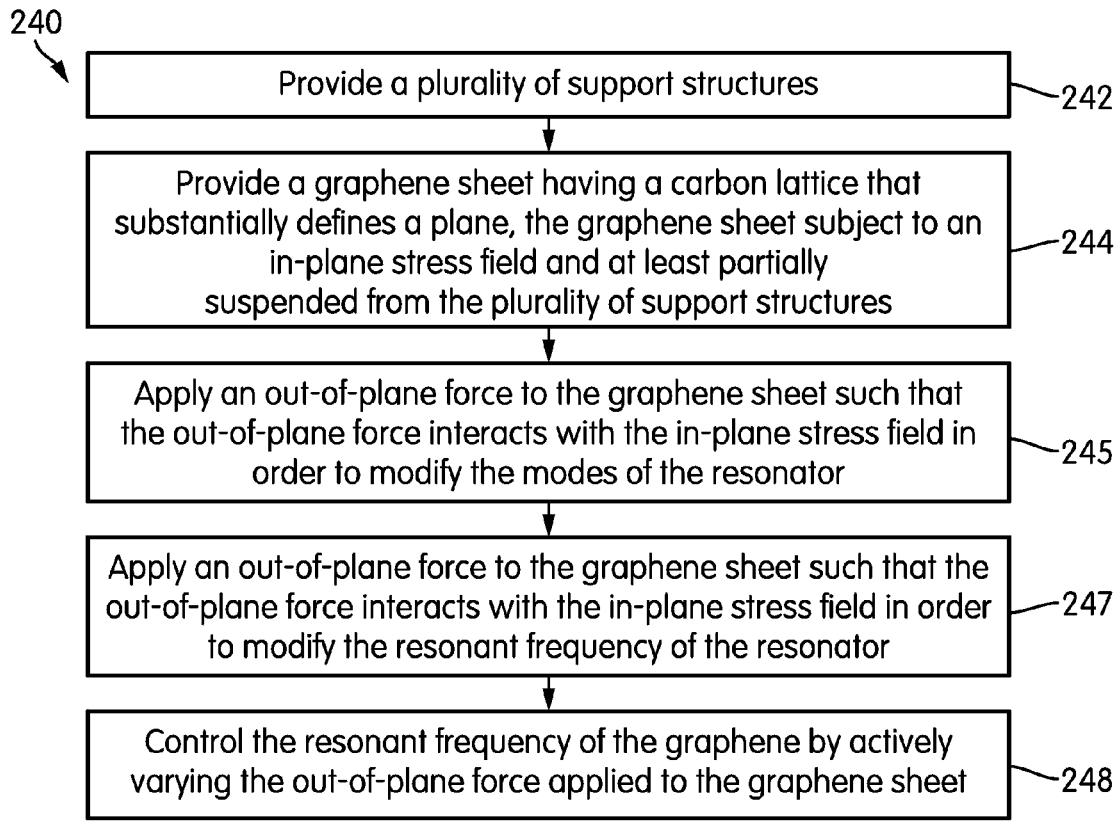
FIG. 24 is a flowchart of a process for controlling the resonant frequency of a suspended graphene nanomechanical resonator, shown according to another embodiment.

Referring to FIG. 24, a flowchart of a process 240 for controlling the resonant frequency of a suspended graphene nanomechanical resonator is shown, according to an exemplary embodiment. Process 240 is shown to include the steps of providing a plurality of support structures (step 242) and providing a graphene sheet having a carbon lattice that substantially defines a plane, the graphene sheet subject to an in-plane stress field and at least partially suspended from the plurality of support structures (step 244). Process 240 further includes one or both of the steps of applying an out-of-plane force to the graphene sheet such that the out-of-plane force interacts with the in-plane stress field in order to modify the modes of the resonator (step 245) and applying an out-of-plane force to the graphene sheet such that the out-of-plane force interacts with the in-plane stress field in order to modify the resonant frequency of the resonator (step 247). Process 240 further includes the step of controlling the resonant frequency of the graphene by actively varying the out-of-plane force applied to the graphene sheet (step 248).

Figure 25:
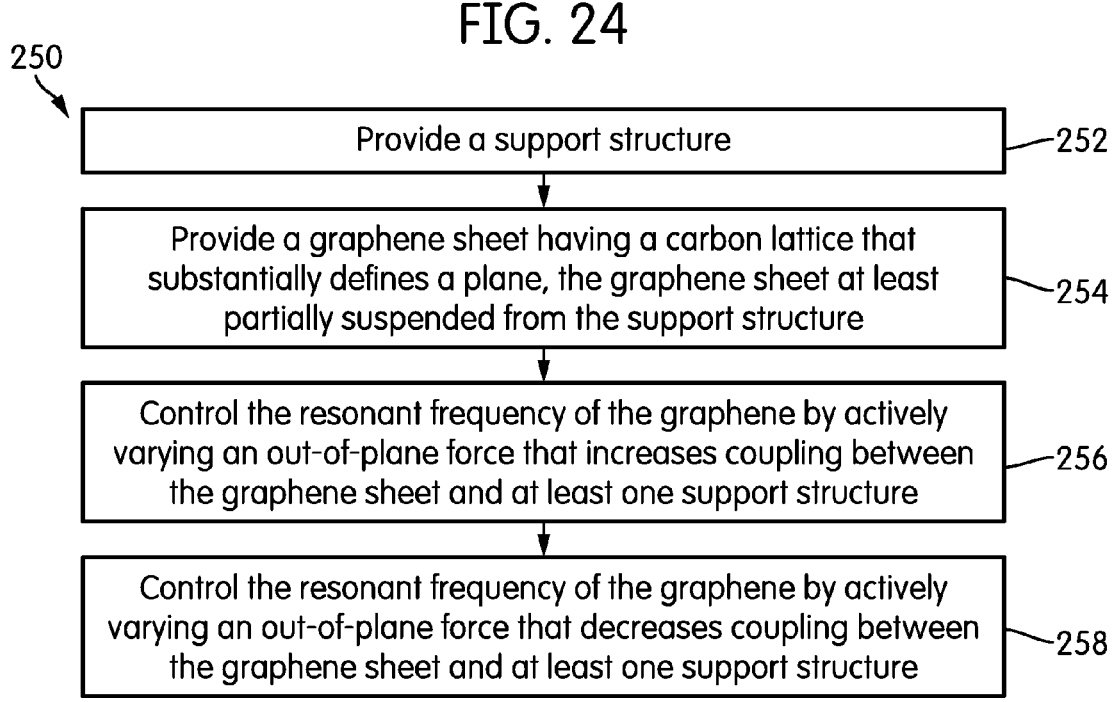
FIG. 25 is a flowchart of a process for controlling the resonant frequency of a suspended graphene nanomechanical resonator, shown according to another embodiment.

Referring to FIG. 25, a flowchart of a process 250 for controlling the resonant frequency of a suspended graphene nanomechanical resonator is shown, according to an exemplary embodiment. Process 250 is shown to include the steps of providing a support structure (step 222) and providing a graphene sheet having a carbon lattice that substantially defines a plane, the graphene sheet at least partially suspended from the support structure (step 224). Process 250 further includes one or both of the steps of controlling the resonant frequency of the graphene by actively varying an out-of-plane force that increases coupling between the graphene sheet and at least one support structure (step 256) and controlling the resonant frequency of the graphene by actively varying an out-of-plane force that decreases coupling between the graphene sheet and at least one support structure (step 258). The controlling steps 256, 258 may be performed in either order or substantially simultaneously.

Figure 26:
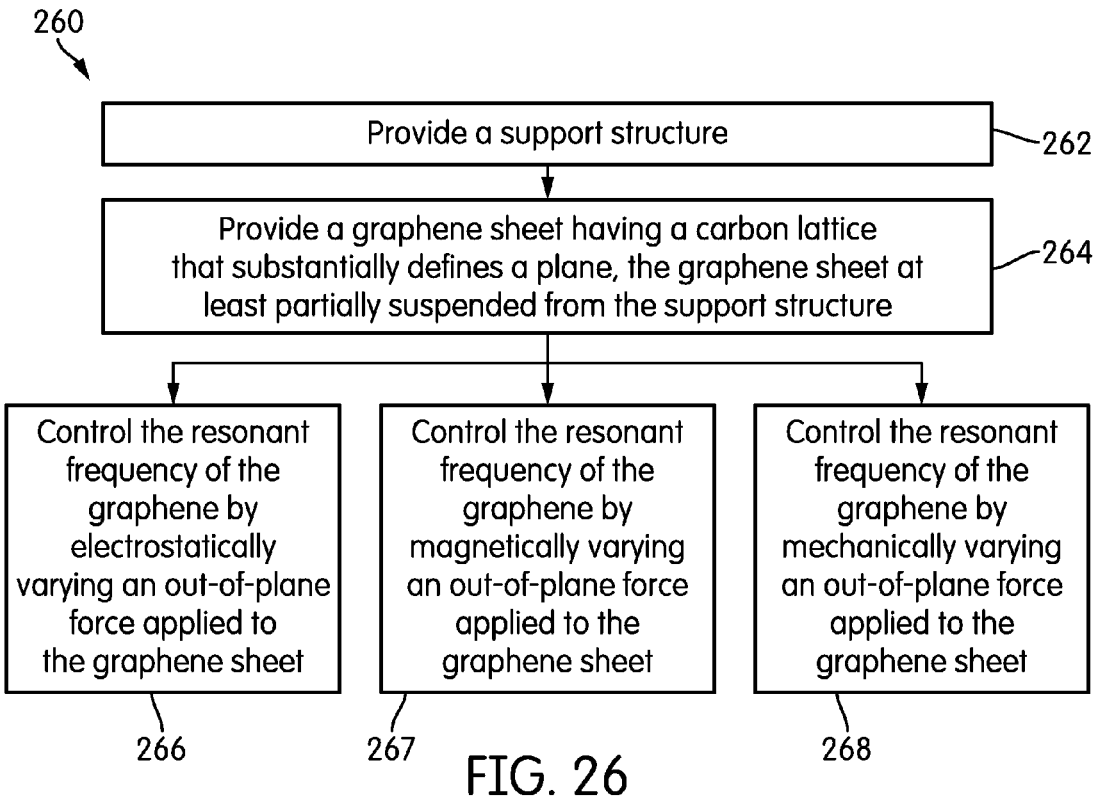
FIG. 26 is a flowchart of a process for controlling the resonant frequency of a suspended graphene nanomechanical resonator, shown according to another embodiment.

Referring to FIG. 26, a flowchart of a process 260 for controlling the resonant frequency of a suspended graphene nanomechanical resonator is shown, according to an exemplary embodiment. Process 260 is shown to include the steps of providing a support structure (step 262) and providing a graphene sheet having a carbon lattice that substantially defines a plane, the graphene sheet at least partially suspended from the support structure (step 263). Process 260 further includes one of the steps of controlling the resonant frequency of the graphene by electrostatically varying an out-of-plane force applied to the graphene sheet (step 266), controlling the resonant frequency of the graphene by magnetically varying an out-of-plane force applied to the graphene sheet (step 267), and controlling the resonant frequency of the graphene by mechanically varying an out-of-plane force applied to the graphene sheet (step 268). According to various embodiments, the process 260 may include more than one of the controlling steps 266, 267, 268 depending on the type(s) of actuators 166, 176, 186, 196, 206 used in the resonators 160, 170, 180, 190, 200.

Figure 27:
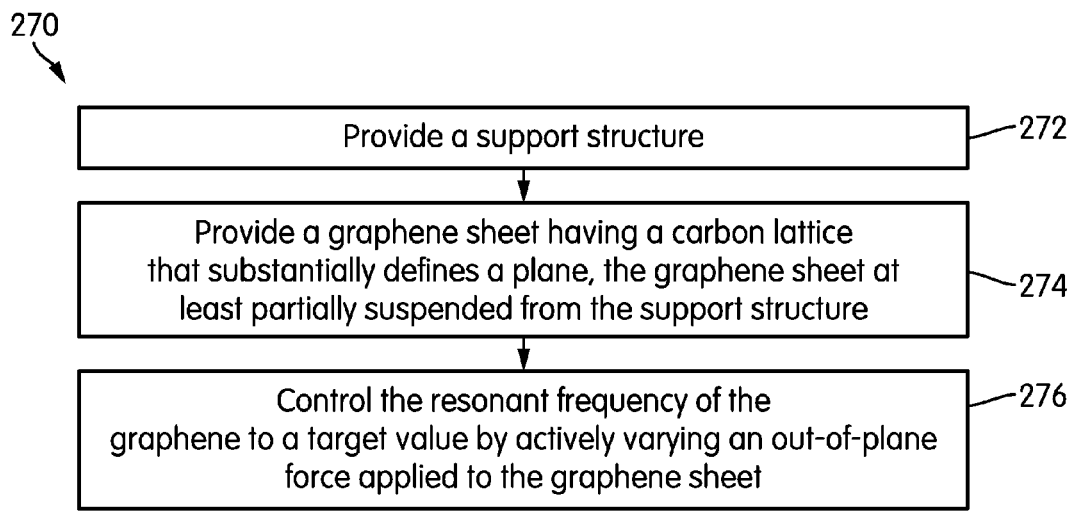
FIG. 27 is a flowchart of a process for controlling the resonant frequency of a suspended graphene nanomechanical resonator, shown according to another embodiment.

Referring to FIG. 27, a flowchart of a process 270 for controlling the resonant frequency of a suspended graphene nanomechanical resonator is shown, according to an exemplary embodiment. Process 270 is shown to include the steps of providing a support structure (step 727), providing a graphene sheet having a carbon lattice that substantially defines a plane, the graphene sheet at least partially suspended from the support structure (step 274), and controlling the resonant frequency of the graphene to a target value by actively varying an out-of-plane force applied to the graphene sheet (step 276).

The construction and arrangement of the apparatuses and methods as shown in the exemplary embodiments are illustrative only. Although only a few embodiments have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies described herein may be constructed from any of a wide variety of materials that provide sufficient strength or durability, in any of a wide variety of colors, textures, and combinations. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The order or sequence of any process or method steps may be varied or re-sequenced according to alternative embodiments. Also, two or more steps may be performed concurrently or with partial concurrence. Other substitutions, modifications, changes, and omissions may be made in the design, operating configuration, and arrangement of the preferred and other exemplary embodiments without departing from the scope of the appended claims.

What is claimed is:

1. A nanomechanical resonator, comprising:
processing electronics configured to control an actuator to actively control a resonant frequency of a portion of a graphene sheet by applying a variable out-of-plane force to the graphene sheet, the graphene sheet at least partially suspended from a support structure and having a carbon lattice that substantially defines a plane.

2. The resonator of claim 1, wherein the graphene sheet includes a length dimension and a width dimension, and wherein the length dimension is comparable with the width dimension.

3. The resonator of claim 2, wherein the graphene sheet forms a drum head.

4. The resonator of claim 2, wherein the graphene sheet substantially forms at least one of a circle, a rectangle, and a polygon.

5. The resonator of claim 2, wherein the graphene sheet is fully supported around a perimeter of the graphene sheet.

6. The resonator of claim 2, wherein the graphene sheet comprises a free surface disposed along a perimeter of the graphene sheet.

7. The resonator of claim 2, wherein the graphene sheet comprises an interior surface, and wherein the interior surface is a free surface.

8. The resonator of claim 2, wherein the graphene sheet comprises an interior surface, and wherein the support structure couples to the interior surface of the graphene sheet.

9. The resonator of claim 1, wherein the actuator is configured to mechanically vary the out-of-plane force, and wherein the actuator comprises a piezoelectric actuator coupled to a support structure.

10. The resonator of claim 1, wherein the actuator is configured to change the resonant frequency of the graphene sheet to a new value.

11. The resonator of claim 1, wherein the actuator is configured to control the resonant frequency of the graphene sheet to a reference value in response to an environmental disturbance.

12. A method of controlling a resonant frequency of a graphene nanomechanical resonator, comprising:
controlling, by processing electronics, an actuator to actively control a resonant frequency of a portion of a graphene sheet by applying an out-of-plane force to the graphene sheet, the graphene sheet at least partially suspended from a support structure and having a carbon lattice that substantially defines a plane.

13. The method of claim 12, wherein the graphene sheet includes a length dimension and a width dimension, and wherein the length dimension is at least three times greater than the width dimension.

14. The method of claim 12, wherein the graphene sheet includes a length dimension and a width dimension, and wherein the length dimension is at least ten times greater than the width dimension.

15. The method of claim 14, wherein the graphene sheet includes a first end and a second end disposed lengthwise opposite the first end, and wherein the graphene sheet is supported at the first end by the support structure.

16. The method of claim 15, further comprising a second support structure;
wherein the second end of the graphene sheet is supported by the second support structure.

17. The method of claim 16, further comprising suspending the second end of the graphene sheet from the second support structure.

18. The method of claim 12, wherein the graphene sheet is supported by a plurality of supports and is subject to an in-plane stress field.

19. The method of claim 18, wherein the in-plane stress field is purely tensile.

20. The method of claim 18, wherein the in-plane stress field includes a shear component.

21. The method of claim 18, wherein the in-plane stress field is isotropic.

22. The method of claim 18, wherein the in-plane stress field is anisotropic.

23. The method of claim 18, wherein the out-of-plane force applied to the graphene sheet is configured to interact with the in-plane stress field to modify at least one of the modes and resonant frequency of the resonator.

24. The method of claim 18, further comprising applying the out-of-plane force to the graphene sheet such that the out-of-plane force interacts with the in-plane stress field to modify at least one of the modes and resonant frequency of the resonator.

25. A method of controlling a resonant frequency of a graphene nanomechanical resonator, comprising:
controlling, by processing electronics, a resonant frequency of a portion of a graphene sheet by applying an out-of-plane force to the graphene sheet, the graphene sheet at least partially suspended from a support structure and having a carbon lattice that substantially defines a plane.

26. The method of claim 25, wherein varying the out-of-plane force comprises varying a support boundary condition.

27. The method of claim 26, wherein varying the support boundary condition modifies the resonant frequency of the resonator.

28. The method of claim 26, wherein varying the out-of-plane force increases coupling between the graphene sheet and at least one support structure.

29. The method of claim 26, wherein varying the out-of-plane force decreases coupling between the graphene sheet and at least one support structure.

30. The method of claim 26, wherein varying the out-of-plane force increases an unsupported length of the graphene sheet.

31. The method of claim 26, wherein varying the out-of-plane force decreases an unsupported length of the graphene sheet.

32. The method of claim 26, wherein varying the out-of-plane force uniformly varies the out-of-plane force over a width of the graphene sheet.

33. The method of claim 26, wherein varying the out-of-plane force uniformly varies the out-of-plane force over a perimeter of the graphene sheet.

34. The method of claim 26, wherein the out-of-plane force is limited to a specified region of the graphene sheet.

35. The method of claim 26, wherein the out-of-plane force is limited to a plurality of specified regions of the graphene sheet.

* * * * *